United States Patent [19]
Hermary et al.

[11] Patent Number: 5,615,003
[45] Date of Patent: Mar. 25, 1997

[54] ELECTROMAGNETIC PROFILE SCANNER

[76] Inventors: Alexander T. Hermary, No. 201 - 1159 Main Street, Vancouver, B.C., Canada, V6A 4B6; Terrance J. Hermary, 1201-4266 Grange, Burnaby, B.C., Canada, V5H 1P2

[21] Appl. No.: 346,392

[22] Filed: Nov. 29, 1994

[51] Int. Cl.$^6$ .............................. G01B 11/24; G01C 7/00
[52] U.S. Cl. ...................... 356/3.03; 356/376; 382/106; 250/559.23
[58] Field of Search ........................... 356/3.03, 3.06, 356/3.07, 376; 250/559.23, 559.22, 237 G; 235/463; 382/106, 199, 266

[56] References Cited

U.S. PATENT DOCUMENTS

| | | | |
|---|---|---|---|
| Re. 32,984 | 6/1989 | Rosenfeld et al. | 348/136 |
| 3,543,241 | 11/1970 | Leuck | 235/463 |
| 3,617,707 | 11/1971 | Shields et al. | 235/463 |
| 3,699,312 | 10/1972 | Jones et al. | 235/463 |
| 3,761,685 | 9/1973 | Alpert et al. | 235/463 |
| 3,866,052 | 2/1975 | Di Matteo et al. | |
| 4,188,544 | 2/1980 | Chasson. | |
| 4,197,888 | 4/1980 | McGee et al. | |
| 4,613,234 | 9/1986 | Cruickshank. | |
| 4,634,278 | 1/1987 | Ross et al. | 356/376 |
| 4,645,348 | 2/1987 | Dewar et al. | |
| 4,648,717 | 3/1987 | Ross et al. | 356/376 |
| 4,667,099 | 5/1987 | Arai et al. | 250/235 |
| 4,687,325 | 8/1987 | Corby, Jr. | |
| 4,794,550 | 12/1988 | Greivenkamp, Jr. | |
| 4,846,577 | 7/1989 | Grindon. | |
| 4,900,146 | 2/1990 | Penney et al. | |
| 4,937,445 | 6/1990 | Leong et al. | |
| 4,941,100 | 7/1990 | McFarlane et al. | |
| 5,041,726 | 8/1991 | Chang et al. | |
| 5,201,351 | 4/1993 | Hurdle, Jr. | |
| 5,307,151 | 4/1994 | Hof et al. | |
| 5,326,961 | 7/1994 | Sibata et al. | 235/463 |

*Primary Examiner*—Stephen C. Buczinski
*Assistant Examiner*—Pinchus M. Laufer
*Attorney, Agent, or Firm*—Robert H. Barrigar; Barrigar & Moss

[57] ABSTRACT

A system for determining the shape and dimensions of a surface of an object includes a projector for projecting onto the object a spatially coded pattern of radiation, e.g., light. The system also includes a receiving device capable of imaging the reflected pattern, and a discriminator for determining which portion of the reflected pattern corresponds to which portion of the projected pattern. By this means, a received signal representing less than the complete reflection from the projected pattern can be correlated with a discrete portion of the scanned object. The procedure is repeated to obtain enough reliable data to generate a reasonably reliable surface profile. The resulting set of received signals and correlations are used to calculate the shape and dimensions of the object.

95 Claims, 9 Drawing Sheets

ELECTROMAGNETIC PROFILE SCANNER

BACKGROUND OF THE INVENTION

This invention relates generally to a method and apparatus for the measurement of the dimensions of an object, and more particularly to a non-contact system to generate measurement data representative of planar sections of an object and contour maps of an object (which data may be used as an input to suitable process control apparatus), and to a spatially coded pattern for use with such system. The invention will be described primarily in connection with using electromagnetic radiation to obtain measurement data representing planar sections (profiles) of the external surfaces of logs so as to compute the three-dimensional surface profile of each individual log for the purpose of adjusting sawing equipment in saw mills (for example, to optimize the quantity or value of the lumber produced). However, the invention is also applicable to measurement of other objects, particularly where rapid and accurate shape determination is necessary. Such measurements may be made both as to objects' external surfaces and also as to internal interfaces (e.g. imaging and measurement of internal organs for medical purposes), the latter when suitable penetrating radiation is reflected from such internal interfaces and detectable (as reflected) by a suitable receiver. Further, the invention, while described as using electromagnetic radiation, is applicable to measurements using other forms of radiation, such as sound or particles, so long as reflection occurs from either an external or internal interface, and so long as a pattern divisible into distinguishable pattern elements as herein described may be applied to such radiation and detected by a suitable receiver.

The simplest non-contact automatic method commonly used to determine the shapes of logs is known in the prior art as shadow scanning. The log moves past a row of beams of light and the cross-sectional width of the log is determined by measuring the shadow cast by the log on an array of sensors on the other side of the log, which sensors are lined up with the projected light beams. Beams of light must be applied from several directions and sensed by a corresponding set of sensor arrays to obtain even a rough profile. The shadow method cannot measure or even detect concave features such as hole in the log. It measures the outer envelope of the profile of the log.

Other methods known in the prior art for determining the shape of an object without contact depend on the principle of triangulation, which has been known historically prior to the present century. The application of this principle can be illustrated by considering a single beam of light transmitted in a known direction in space from a known location at an object being measured. Some suitably selected form of receiving system positioned so as to view the object from a direction different from the direction at which the light was transmitted detects the direction from the receiving system at which the reflection from the projected light spot appears on the object being measured. The distance between the transmitter and the receiver is known and fixed. Hence two angles (determined from the transmitting and receiving directions) and one side of a triangle (the distance between the transmitter and the receiver) are determined, and thus the location of the spot on the object relative to the measuring apparatus is easily calculated.

To use triangulation to measure the shape of an object (rather than merely to measure the coordinates of a single point), many spots in a raster pattern or the like would have to be determined. This could be done by projecting a pattern of beams simultaneously, by sweeping one beam over the surface of the object in a suitable scanning pattern in a continuous motion, or by projecting a sequence of beams, one at a time, at different points on the object being measured (this technique is often referred to as "time multiplexing"). Simultaneous projection, as taught by the prior art, is not able to reliably measure irregular surfaces because identification of a particular spot with a particular transmitted beam becomes uncertain or ambiguous if any spots are obscured. In some cases, the ambiguity or uncertainty could be overcome by the use of a reference spot whose coordinates are known, thereby enabling the operator to establish a correspondence between at least one transmitted beam and one detected spot. However, ambiguity or uncertainty would remain a problem for other spots in the pattern, even if the reference spot were located unambiguously, as identification of spots other than the reference spot depends on the assumption that no spots between the reference spot and the spots to be identified are obscured. While beam sweeping and time multiplexing do not entail the foregoing ambiguity problem, both are subject to the problem that the accurate instantaneous measurement of the profile of an object such as a log moving rapidly is difficult, by reason of the need for adequate computing time required to determine each profile. For example, in a typical saw mill, logs move at 500 feet per minute, so that to obtain profiles of, say, 1" apart (axially) on the log requires that each scan take less than 10 milliseconds.

An alternative surface profile measurement apparatus taught in Leong, U.S. Pat. No. 4,937,445, granted on 26 Jun. 1990, that is alleged to achieve unique identification of detected spots with transmitted beams, uses a small number of beams, so that within a limited depth of range, the spot from each beam will be observed within a limited region on the imaging device. However, this implies that increasing the number of beams to increase resolution of surface features decreases the range of depths that can be measured. Further, accurate knowledge of the direction of each beam in the Leong technique is critical, making frequent calibration necessary.

An alternative taught in Corby, U.S. Pat. No. 4,687,325, granted on 18 Aug. 1987, is to project onto the scanned object a time-separated series of different complete-scan patterns of beams so that identification of the pattern of spots on the scanned object can be used to identify beams uniquely with detected spots. Triangulation is used to obtain the spatial coordinates of the spots. Corby requires the sequential projection of a series of mutually differing patterns of beams, and so suffers from the same problem from which beam sweeping and time multiplexing suffer, namely the inability to determine the instantaneous profile of a rapidly moving object. Furthermore, complexity arises in Corby from the need to transmit a plurality of different patterns in time sequence.

For the foregoing reasons, it can be readily understood that the problem of measuring at a distance the surface profiles of irregular objects moving rapidly along a production line (say) is not solved satisfactorily by the known art. A satisfactory measuring apparatus should:

(a) have either (i) the capability to make very fast (snapshot) measurements of the profile of the object so that as the object moves past the measuring apparatus, the surface contour of the entire object can be built up as a series of profiles; or (ii) the capability to make a measurement of the entire surface contour of the object at one time;

(b) have the ability to cope with failure to receive portions of the transmitted pattern (due to irregularity of surface features of the object or to the occlusion of portions of the object by intervening spurious objects);

(c) be compact, rugged, with a minimum of moving parts;

(d) not require frequent calibration; and (e) have sufficient resolution and depth of field to measure accurately irregular objects such as logs.

The prior art teaches that a multiplicity of discrete beams (a pattern) projected simultaneously onto the object to be measured from different angles is needed to satisfy the requirements set out above for the rapid measurement of the complete surface profile of the object. However, the beam patterns taught in the prior art are not satisfactory as they do not enable reliable measurements to be made in situations that can occur in a sawmill and in other scanning situations, namely that the received signal may not represent the entirety of the transmitted scanning beam. There are various reasons why this may happen. The log may be smaller than the transmitted scanning beam. Irregularities on the surface of the object being scanned (e.g., bumps on the log) may occlude a portion of the log's surface such that the scanning beam does not reach the surface in question, or the bump may occlude the light reflected from the portion in question. Further, a log is carried by a conveyor, and sometimes the scan intersects a portion of the conveyor instead of the log, the log's surface being occluded by such conveyor portion. Consequently, the reflected light signal may be unreliable; portions of it may have to be rejected. Furthermore, if only a portion of the total scanned beam is received reliably by the detector, it may not readily be possible (within the teaching of the prior art) to correlate the received portion with any particular part of the log or other object being scanned. If the received signal cannot reliably be correlated with a particular portion of the object being scanned, then the received signal may be useless to the purpose at hand.

SUMMARY OF THE INVENTION

The present invention, like some other prior inventions, makes use of the concept of structured light or other radiation. According to this concept, a detector is able to identify the point of change from, for example, transparency to opacity, from brightness to darkness, from one color (wavelength) to another, or from one polarization to another, in accordance with the nature of the detector. If brightness to darkness is used, a suitable structured light pattern is projected onto the object to be measured so that these light-to-dark and dark-to-light transition points may be identified. According to the present invention, the pattern of structured light (or other radiation) is coded such that discretely and uniquely identifiable sub-patterns exist that can be correlated with corresponding portions of the transmitted pattern, and thus with corresponding portions of the object being scanned. This requires that the beam of light, or other radiation that is projected onto the object being scanned, be patterned and coded in such a manner that sub-patterns (subsets of the pattern) above some predetermined size can be uniquely identified and associated with a specific portion of the scanning beam, and thus with the object being scanned.

In one aspect, the invention provides a projector for projecting a pre-determined coded pattern of radiation onto a scanned object. For log scanning applications, the radiation is preferably light. Light or other chosen radiation reflected from the scanned object is detected and processed by a detector in the nature of an imaging device per se known in the technology, so as to generate a useful output signal representing the reflected radiation. Preferably the analog signal thus obtained is converted to a digital signal for further processing. The principle of triangulation is used to obtain the coordinates of points on the object being scanned relative to the projector or detector. The resulting data can be further analyzed and processed according to known techniques to obtain a useful technical or industrial result. For example, profile information concerning the shape and dimensions of a log may be used to control a saw and edgers in a sawmill to cut the maximum number of boards of predetermined cross-sectional dimensions from the log, boards with the maximum value, or boards with dimensions specially ordered by a customer.

Because scanning and detection apparatus according to the invention makes use of the well-known principle of triangulation to obtain reliable distance information relative to the object being scanned, and because apparatus according to the invention makes use in part of a combination of devices that are per se known in the technology, such devices will accordingly not be described in detail in this specification.

Apparatus constructed in accordance with the invention need not include any mechanical moving parts for projecting the scanning beams or for receiving and detecting the reflected signal. The inventive apparatus reliably correlates the received signal corresponding to only a portion of the projected scanning beam (such portion being greater in size than some predetermined minimum that depends upon the characteristics of the projected beam in conjunction with a preselected spatially coded pattern, as will be described further below) with a counterpart portion of the projected beam, so that useful profile information is obtained about the object being scanned, even though such information may relate to only part of the scanned object. If enough useful information is obtained on a partial scan basis over a sufficient scanning area, then there may be enough information obtained in total by combining the useful information for any given scan with the useful information obtained from other scans that the entirety of the profile of the scanned object may be reliably ascertained.

The predetermined coded pattern used in apparatus according to the invention is selected so that for any given scan, the smallest useful portion of the projected scanning beam is characterized by an array of discernible pattern elements that enable any one such smallest useful portion to be distinguished from any other smallest useful portion. Accordingly, if only a relatively small portion of the reflected signal is useful, then if that signal is characterized by an array of pattern elements that correspond uniquely to an array of pattern elements of a portion of the projected signal at least as large as the smallest useful portion thereof, it follows that the reflected signal data can also be correlated uniquely with an identifiable discrete portion of the scanned object.

The significant advantage of the invention is thus that if the reflected signal detected by the detector corresponds to only a portion of the projected scanning beam (or matrix), then that reflection signal information can nevertheless be processed to obtain reliable profile information about an identifiable portion of the object being scanned. This is possible according to the invention because of the use of a suitable coded pattern having uniquely identifiable divisions. The projected beam strikes or scans the object with the pattern characteristics superimposed, and consequently the pattern as projected onto and reflected from the scanned object will also be capable of recognition in the reflected signal. The character of the pattern will vary depending upon whether a one-dimensional scan (obtaining profile information in two dimensions along the intersection of a plane with the surface of the object scanned) or a scanning matrix in two dimensions (obtaining three dimensional profile information of the object scanned) is used, and depending upon a number of other parameters to be given due consideration by the system designer, including the resolution of the projected pattern on the surface of the scanned object, the overall size of the object being scanned, the resolution capability of the detector, an assessment of the smallest portion of the scanned object about which any profile information will be considered useful, the general expected shape of the object being scanned, and the industrial or technical purpose to which the profile information is to be put.

If a given scan yields two or more subgroups of received pattern data that are correlatable with two or more identifiable portions of the scanned object, then the spatial coordinates of those two or more identifiable portions may be determined.

To give two examples that illustrate the distinctions between two different possible applications of the present invention, consider the scan of a log in a sawmill on the one hand, as against the scan of a small fossil or artifact by an archaeologist, on the other hand. In the one case, the sawmill operator wishes to obtain the largest possible number of board feet of lumber of certain cross-sectional dimensions (say), and in the other instance, the archaeologist wants to obtain a non-contact surface profile of the fossil (say) so as to be able to reproduce it exactly for study purposes, without damaging the original. It is immediately evident that the parameters and factors to be considered, including those mentioned in the preceding paragraph, will be different from one another in these two different possible applications of the invention. Of course, in each case, other factors unrelated to the present invention may enter into the decision making—for example, the final decision as to the cutting of a log may depend upon an assessment of where the knots are as well as upon the exterior profile of the log, but that consideration in the decision-making process is entirely irrelevant to the present invention, which is concerned with profile characteristics only. (Of course, given satisfactory resolution, the profiler of the present invention can help to identify the probable surface location of knots on the log.)

In a simple one-dimensional scanning beam yielding two-dimensional profile information along the intersection of a plane with the surface of the object being scanned, the scanning pattern may resemble, for example, a bar code of the sort applied to goods in a grocery for price identification. Just as the varying light and dark patterns in a bar code represent uniquely determinable numeric information as one proceeds from one end of the bar code pattern to the other, so a structured light pattern according to the invention corresponds to uniquely identifiable subsets of useful spatial information. Each subset of detected reflected radiation corresponds to a uniquely and discretely identifiable portion of the projected scanning beam, and thus to a uniquely and discretely identifiable portion of the object being scanned.

If the scanning beam is projected not as a linear one-dimensional scanning beam yielding two-dimensional contour line information about the object being scanned, but instead is projected as a two-dimensional matrix (the matrix could be, for example, Cartesian or polar in character), then the pattern of light-to-dark transitions (say) may be rather more elaborate than a simple bar code, and may conform to a wide variety of two-dimensional configurations. For example, a possible two-dimensional pattern might comprise selected letters of the alphabet distributed over a plane. The character, number, and relative sizes of the elements in the pattern will depend in part upon the factors previously mentioned, e.g., the expected general character of the profile of the object being scanned, its expected size, the resolution of the pattern as projected on the object, the resolution of the detector, the industrial or technical application of the distance data obtained, etc.

An example of the use of the invention to determine the coordinates of the intersection of a plane with the surface of an object, i.e., the contour line of the object in that plane, will be discussed first. Such plane will include the projected beam of structured light (say) having a suitable coded pattern. The use of the invention according to this example to determine the coordinates of the entire surface of a three dimensional object is a straightforward extension, involving projection and detection of a spatially separated sequence of beams over the length of the object, thereby generating a corresponding series of contour line profiles.

To determine a contour line of the object being scanned, the projector of the invention projects a spatially coded pattern of light (say) in a narrow strip across the object. For example, one possible such pattern is a series of light and dark bands (created by alternating transparent and opaque regions of a strip of material through which the transmitted beam is to be projected) running generally perpendicular to the direction of projection of the narrow strip and in which the dark-to-light (opaque-to-transparent) transitions are regularly spaced while the light-to-dark (transparent-to-opaque) transitions (say) are irregularly spaced according to a predetermined pattern, thereby generating discretely identifiable subsets of the pattern. (Either set of transitions could be regularly spaced, so as to identify the boundaries of the pattern elements, whilst the other set is spaced in accordance with the coding applied to the pattern.)

The reflection of the pattern is detected and compared to the projected pattern to determine a one-to-one correspondence between the features of the projected pattern and the reflected pattern. To this end, analysis of subsets of pattern elements of the received pattern data, such subsets selected to be above a certain size in the linear dimension along the strip, affords a means for discriminating between such subsets. This analysis is possible even if only a portion of the projected pattern (above some predetermined minimum size) is received, because the subsets of the pattern as received can be discriminated from one another, leading to a reliable identification of the corresponding portion of the object being illuminated.

One way to obtain the correspondence between a subset of the reflection signal data and the projected pattern is perform a suitable fitting routine on the data. A convolution routine revealing a fit for a given maximum sum result could be used, but the inventors have found that the use of a "least squares" fitting procedure provides satisfactory results. Once this fitting step is done, the coordinates of a point on the surface of the object at which a particular feature of the pattern is seen are determined (using ordinary principles of triangulation) from the distance between the projecting and observing locations and the orientation of the projecting and observing apparatus. If more than one projector/detector pair is used, each functioning through a selected angular range of view, the entire cross-section of the object can theoretically be measured, although in practice at least three and sometimes four or more such pairs operating from several directions about the scanned object, are typically employed in a given application so as to afford complete three-dimensional information about the scanned object. If the object is moved past the projector or the projector is moved past the object, then a three-dimensional image of the object can be generated by combining the results of individual two-dimensional profile data taken at a series of scans along the length of the object.

The invention is thus seen to include as a primary distinguishing feature, use of a spatially coded pattern in apparatus of the foregoing type to allow the determination of a one-to-one correspondence between projected and observed features of the pattern. There are two aspects to this feature. The first aspect is the use of the spatial coding scheme for the projected beam of light (or other radiation), which enables any small portion of the projected pattern to be identified uniquely and distinguished from any other small portion above some predetermined size. The second aspect is the use of the spatial coding to determine a correspondence between a portion of the pattern projected and a corresponding portion of the pattern observed, thereby permitting useful information to be obtained about the shape of that part of the object to which the corresponding portions of the pattern apply, even if information for the complete scan (i.e., complete projected pattern) is not available.

What is not part of the invention is the choice of mechanism for projecting the coded pattern of light or other radiation (although the coded pattern is part of the invention), the choice of apparatus for obtaining an image of the object illuminated in the pattern of radiation, the choice of apparatus for digitizing the image and comparing it electronically to the known pattern being projected, the choice of means for calculating the coordinates of projected features of the coded pattern on the surface of the object (if this is desired), the choice of means for displaying a cross-sectional representation of the object, nor the choice of means for providing data pertaining to that display to other equipment for further or other processing. Suitable projectors, imagers, triangulation calculation routines, monitors, and related software, etc. are already known per se and available in the industry for such purposes.

DETAILED DESCRIPTION OF THE INVENTION

Figure 1:
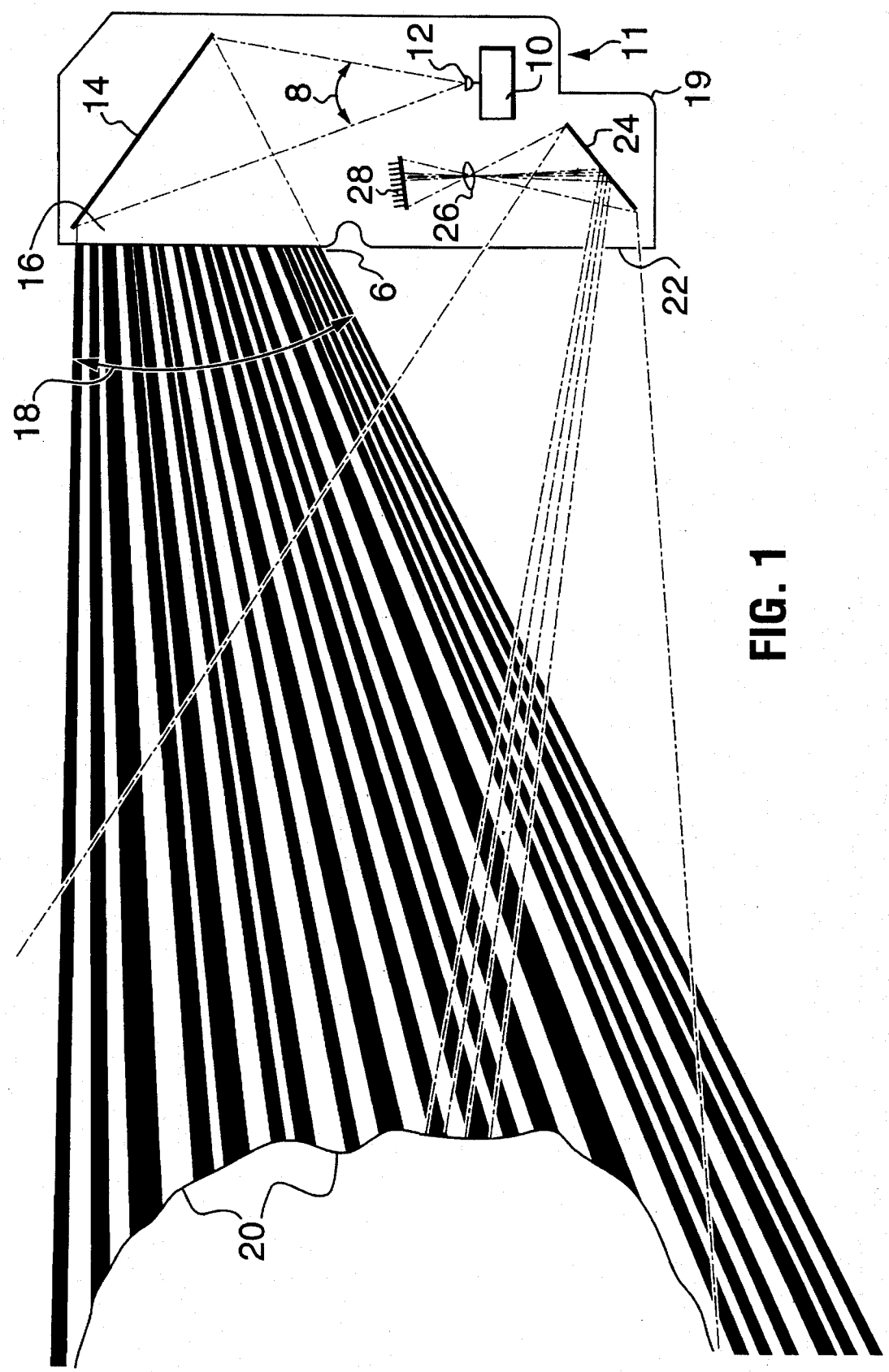
FIG. 1 is an schematic plan view of a first embodiment of electromagnetic profile scanning and detection apparatus according to the invention.

A preferred embodiment of the one-dimensional scan variant of an electromagnetic profile scanner according to the invention is shown in schematic form in FIG. 1 and generally referred to by reference numeral 11. The optical profile scanner 11 is suitable for use in scanning the surface of a log (say) whose longitudinal (axial) extension is generally perpendicular to the plane of a coded scanning beam 18. It is desirable that the profile scanner 11 be placed relatively close to the scanned object so that the resolution of the coded pattern on the scanned object is sufficiently high. For example, the profile scanner 11 might be located from about 16 to 30 inches from the log 20 being scanned. The optical profiler 11 of FIG. 1 makes a series of scans each generally perpendicular to the axis of the scanned log 20. As the log 20 moves past the profile scanner 11, the entire surface profile of the log 20 within the scanning beam is scanned (as a series of line profiles). This can be accomplished by having the projector (e.g. laser source 10) of the profiler 11 project the beam 18 continuously onto the log 20 as it moves past the profiler, and having the receiver (e.g. image sensor 28) take a series of sequential "snapshots" of the reflected light pattern of the log 20 as sequential surface area portions of the log 20 come within the viewing angle of image sensor 28.

An array of such profile scanners 11 may be positioned about the circumference of the log 20 to enable a complete surface profile of the log 20 to be obtained.

The laser light source 10 and a suitable cylindrical lens 12 within the housing 19 of profile scanner 11 produce a beamed sheet (fan) of light of generally uniform intensity across the angle of the sheet, generally indicated as 8. The beamed sheet 8 may be considered to be a two-dimensional sheet lying in the plane of FIG. 1 and having a very small dimension (approximately 0.04" for typical laser sources) perpendicular to the plane of FIG. 1. The beamed sheet 8 is reflected from mirror 14 and is thence transmitted through a mask 16 that encodes the beamed sheet 8 of light into a spatially varying pattern of beams 18 that is directed toward the object 20 (e.g., a log) to be measured. In the preferred embodiment illustrated here, the mask 16 is placed as far as possible from the cylindrical lens 12 for the purpose of minimizing the loss of pattern resolution on the object (log 20) being scanned that arises from diffraction of the beam 8 as it passes through the mask 16.

The angle P through which the beam 18 is projected should not be unduly large, because a large angle tends to entail an unacceptable degree of non-uniformity of size and resolution of pattern elements as projected onto the scanned object (here log 20). To some extent, such non-uniformity can be compensated for by transmitting the beam 8 through a mask 16 that is curved instead of straight, or by varying the relative size of pattern elements as one proceeds from the extremity to the centre of the pattern applied to the mask 16. However, it is preferable to provide several scanners each working in an acceptably small angular range rather than to use too wide a scanning beam 18.

A portion of the diffuse light reflected from the surface of the log 20 passes through a window 22 in profiler housing 19, is reflected by a mirror 24, and is focused by an imaging lens 26 to form an image on the image sensor 28. The window 6 in which mask 16 is placed and the window 22 are the only windows in the otherwise closed profiler housing 19 which housing 19 is opaque to light. The sensor 28 may suitably comprise a linear array of light detecting elements that lie in the same plane as the pattern of beams 18. In the embodiment illustrated, the image sensor 28 is preferably a linear array of charge coupled devices, referred to herein as the CCD array 28.

Mirror 14 and mirror 24 allow the elements of the preferred embodiment illustrated here to fit inside a compact housing while maintaining the preferred spacing of the mask 16 and lens 12. It will be apparent to those skilled in optical design that the mirrors 14 and 24 are not essential to the system, but permit the transmitted and reflected light beams to be "folded" so as to permit the assembly of FIG. 1 to be more compactly designed than would be the case if such mirrors were not used. Further, the negative effects of diffraction of the light beam 8 as it passes through the mask 16 are minimized if the mask 16 is placed as close as possible to the log 20, and the mirror arrangement of FIG. 1 facilitates this objective.

Figure 4:
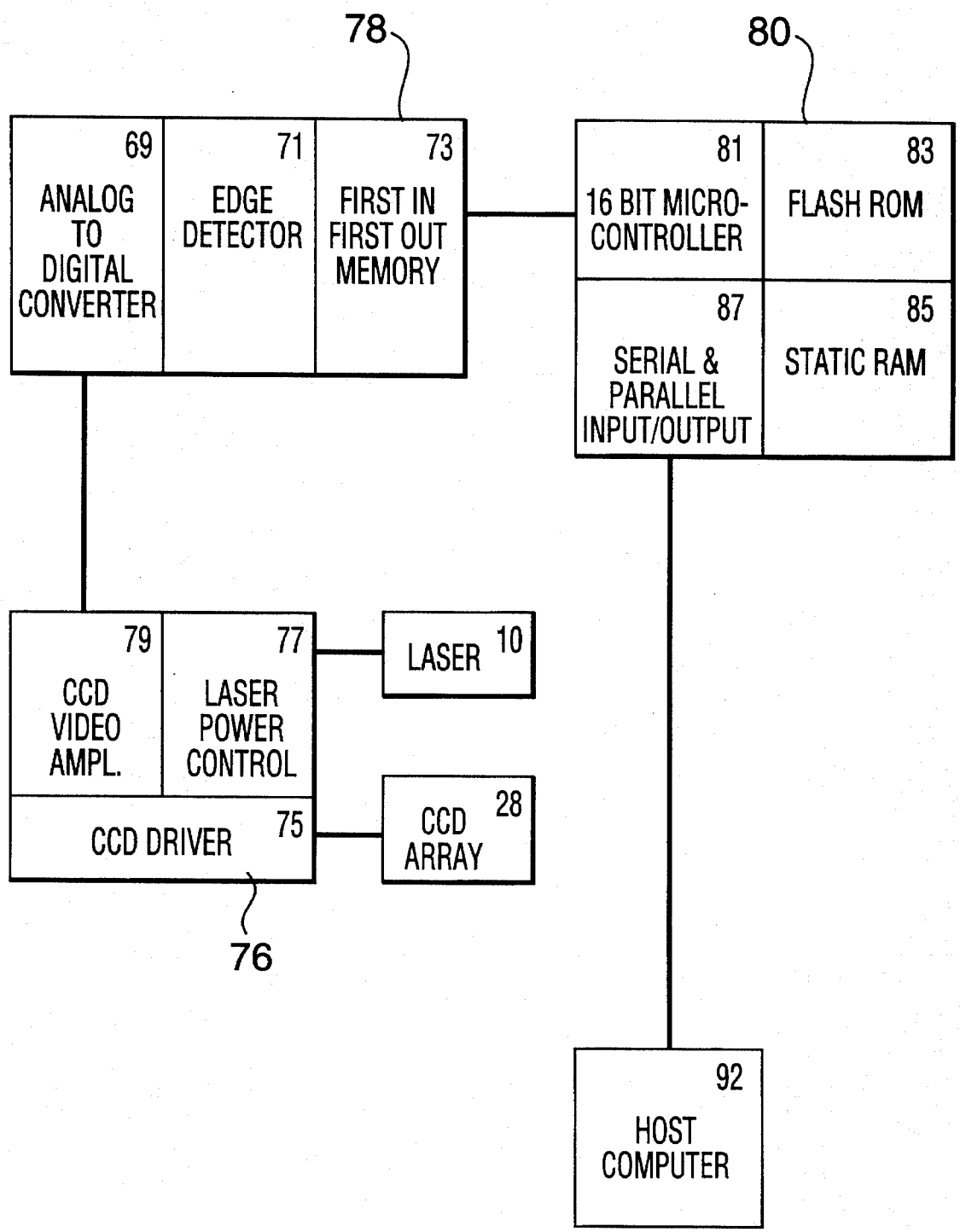
FIG. 4 is schematic block diagram of an embodiment of signal processing and computational apparatus according to the invention for use in conjunction with the scanning and detection apparatus of FIG. 1.
Figure 5:
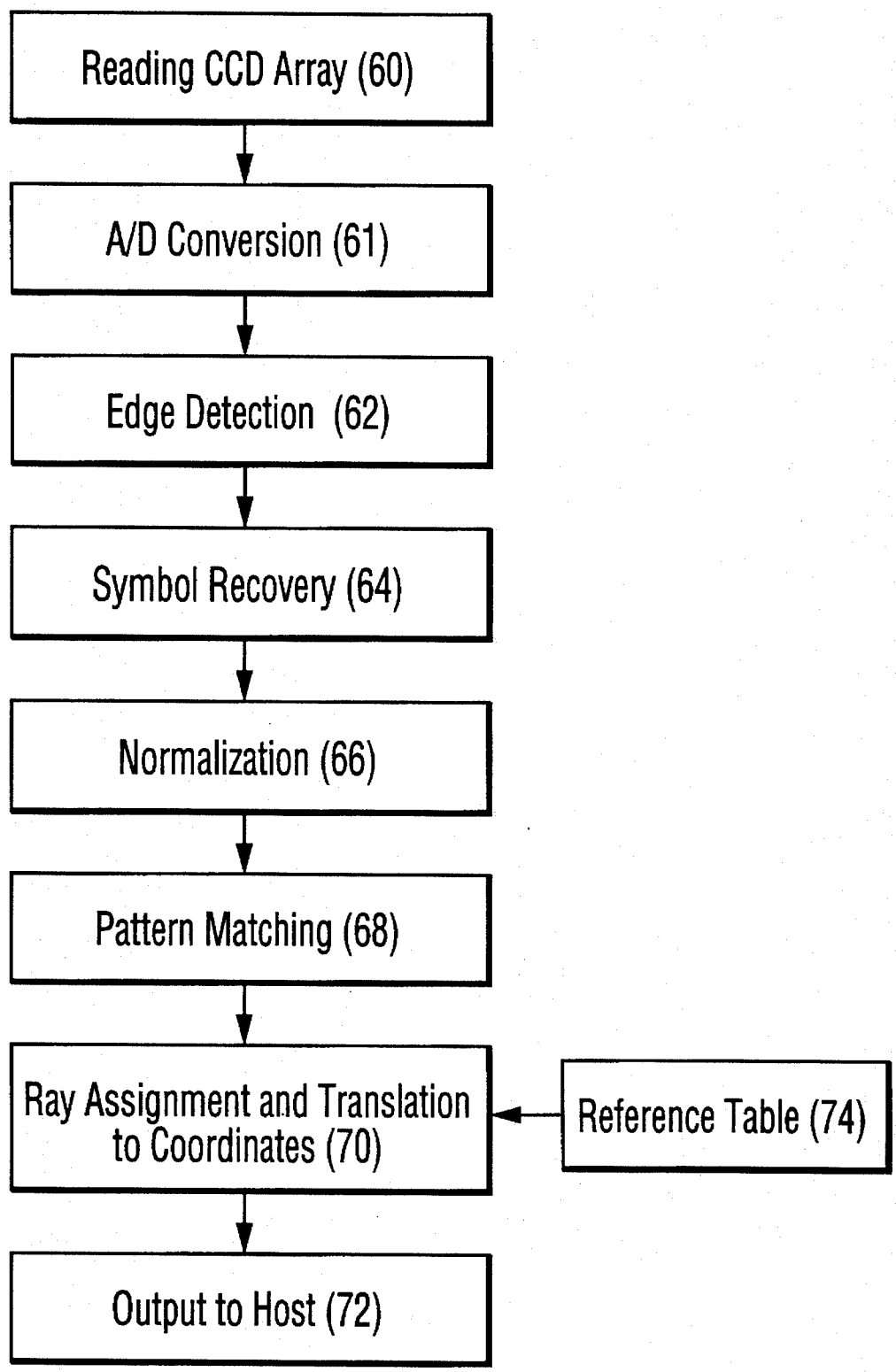
FIG. 5 is a flow chart depicting the flow of data through the signal processing and computational apparatus of FIG. 4.

The image data represented by the accumulated charges on the light sensitive elements (pixels) of the CCD array 28 is read out periodically (once after each scan) and the resulting signal processed by the signal processing apparatus shown schematically in FIG. 4 and operating functionally as represented in FIG. 5 (which structure and operation are described in detail below) to determine the profile of the object 20 lying in the plane of the transmitted encoded pattern of beam 18. Each individual scan gives a line profile of that portion of the object 20 lying in the pattern of beams 18 at any given time. As the object 20 moves past the optical profiler 11, a series of such line profiles generate a surface profile for that portion of the total surface of the object 20 that is scanned by the series of line scans. The signal processing apparatus preferably uses a triangulation technique to determine the coordinates of the regions (spots) of the surface of the object 20 on which each beam of light in the pattern of beams 18 falls.

The application of a suitable triangulation technique is possible because the laser light source 10, the cylindrical lens 12, the mirror 14, the mask 16, the mirror 24, the imaging lens 26, and the CCD array 28 (collectively referred to as the optical elements) are fixed in both orientation and position relative to each other. Once the signal processing apparatus of FIG. 4 identifies a first transmitted beam of light passing through a particular transparent section of the mask 16 with a second reflected beam of light falling on a particular pixel of the CCD array 28 (a process described in detail below), the coordinates of the point (spot) on the object 20 at which the first beam fell can be determined by ray tracing the optical path from the laser light source 10 to the CCD array 28.

Figure 2:
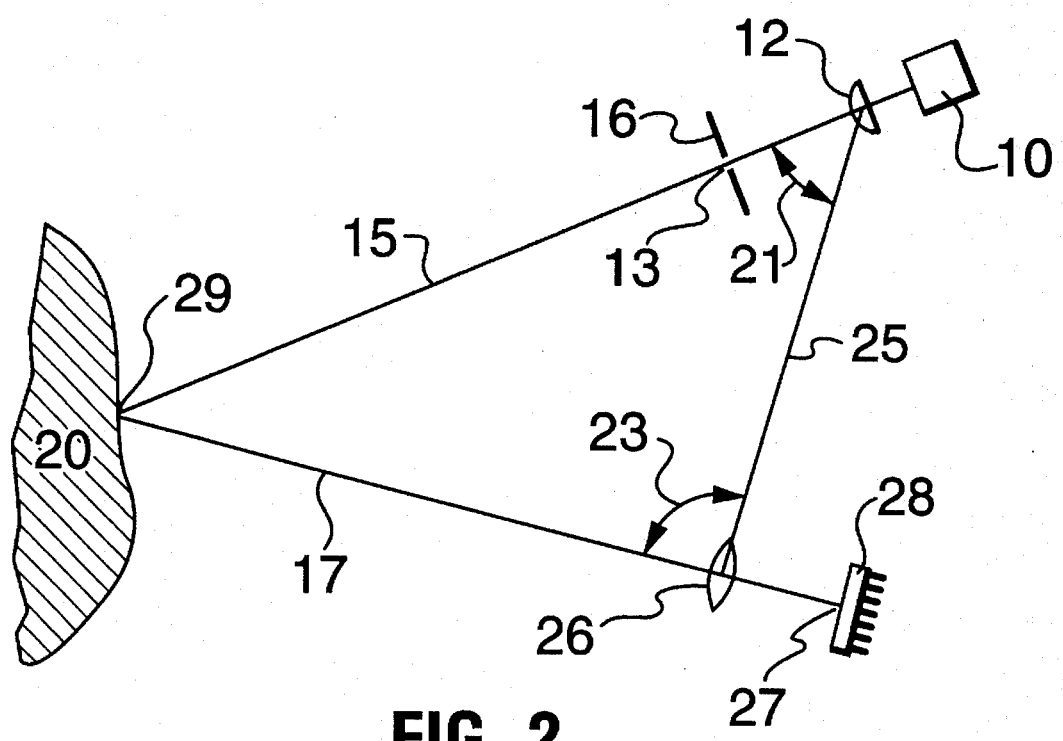
FIG. 2 is schematic diagram showing the unfolded optical path of FIG. 1.

To understand the application of triangulation principles to the invention, consider unfolding the optical paths shown in FIG. 1 by removing the mirrors 14 and 24 and placing the laser light source 10 and cylindrical lens 12 and the imaging lens 26 and CCD array 28 at their respective virtual positions as illustrated in FIG. 2. If we consider a transmitted ray 15 of light passing through a particular transparent section 13 of the mask 16 and the corresponding reflected ray 17 from the object 20 that is detected by a particular pixel 27 of the CCD array 28, then triangulation can be applied to determine the coordinates of the point 29 at which the light ray 15 falls on the object 20 being measured. It can readily be seen that a triangle is formed by portions of:

(a) the incident light ray 15 that originates in the laser light source 10, passes through the cylindrical lens 12, the transparent section 13 of the mask 16, and intercepts the object 20 at point 29; and (b) the reflected light ray 17 that originates at point 29 on the object 20, passes through the imaging lens 26, and is detected by pixel 27 of the CCD array 28; and (c) the base line 25 from the cylindrical lens 12 to the imaging lens 26. (For simplicity, we have assumed that a particular ray falls on a particular pixel, but a typical pattern element of a suitable coded pattern is likely to fall upon a contiguous series of pixels).

The angle 21 between ray 15 and line 25 is measured as part of the calibration of the optical profiler 11 for each transparent section 13 of a given mask 16. Similarly, the angle 23 between ray 17 and line 25 is either measured as part of the calibration of the optical profiler 11 or is found by interpolation from angles measured as part of the calibration for pixels near to pixel 27. Once a ray can be traced through a particular transparent section 13 of the mask 16 and correlated with its reflection from the object 20 to a particular pixel 27 of the CCD array 28, the two angles 21 and 23 are known from the calibration of the optical profiler 11, and the included side of the triangle base line 25 is fixed as part of the construction of the optical profiler 11, so that the distance from the imaging lens 26 or the cylindrical lens 12 to the point 29 on the object 20 can be found from elementary trigonometry, as can the coordinates of point 29 in any coordinate system fixed to the optical elements.

Figure 3:
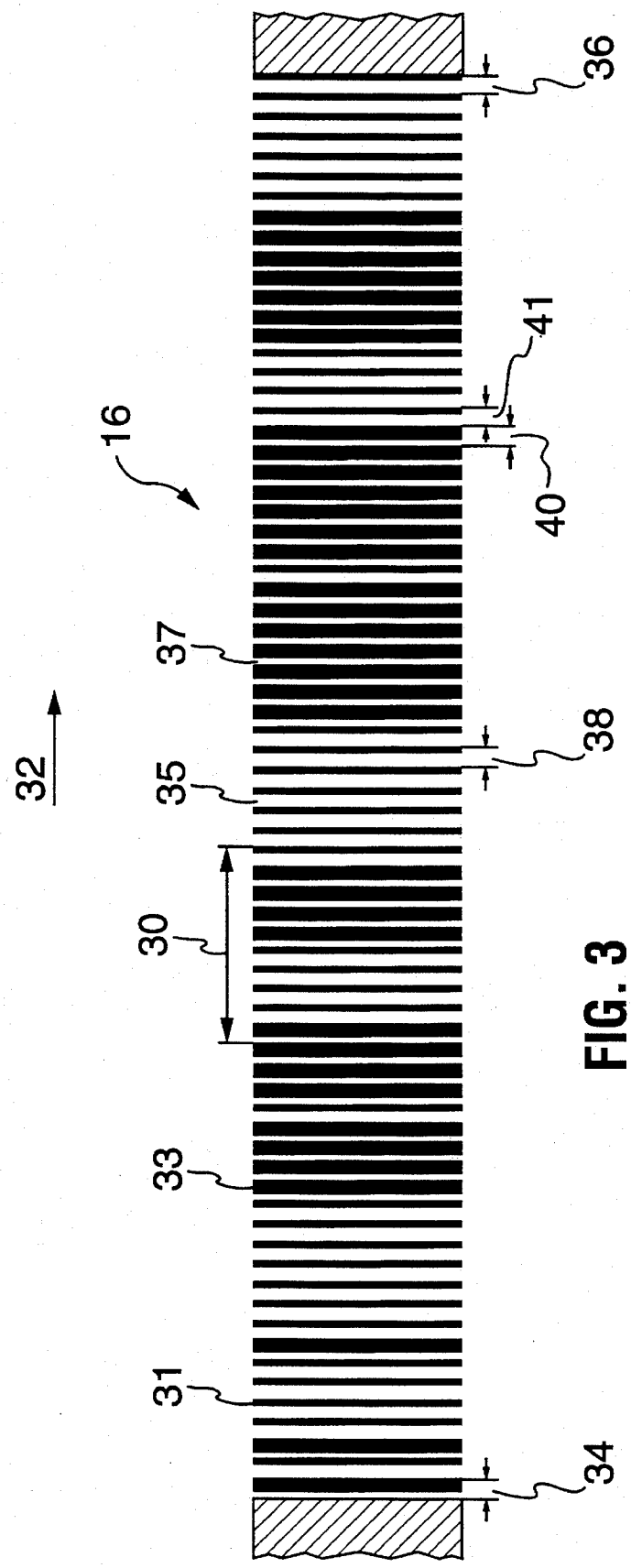
FIG. 3 is a sample mask according to the invention used to generate a suitable pattern of projected light for use in the apparatus of FIG. 1.

An example of a suitable mask 16 for use in the apparatus of FIG. 1 is shown in detail in FIG. 3. In the mask, which may be, for example, a strip of plastic, alternating transparent bands and opaque bands form a pattern. The opaque bands are either narrow bands 31 or wide bands 33. The transparent bands are either wide bands 35 or narrow bands 37. The combined width of an opaque band and the transparent band to its immediate left (as seen in FIG. 3) is constant.

The essential characteristic of the mask 16 is that the pattern be designed so that any sequence of transparent and opaque bands larger than some minimum size, which is a characteristic of the design, be distinguishable from all other sequences of bands in the pattern that are the same size. For example, examination of FIG. 3 will confirm that the sequence 30 of bands does not appear elsewhere in the mask pattern shown in FIG. 3. Shorter sequences of bands that are not unique may be found in the mask pattern shown in FIG. 3; e.g., a wide light band next to a narrow dark band or a narrow light band next to a wide dark band both appear repeatedly in the mask pattern shown in FIG. 3.

It is the purpose of the invention to make possible a correlation of the specimen signal read out of the CCD array 28 for the reflected light from the irregular surface of a particular test object 20 illuminated by light that has passed through the sample mask pattern shown in FIG. 3, with the features of the sample mask pattern shown in FIG. 3. The transmitted pattern in the pattern of beams 18 is of course determined by the pattern of light and dark bands in the mask 16. For the purpose of comparing the transmitted pattern with the received pattern, the transmitted pattern is divided into pattern elements each comprising a light (transparent) band and an adjacent dark (opaque) band immediately to its right (as seen in FIG. 3). These pattern elements can each be described as beginning with a rising edge (dark-to-light transition), followed by a falling edge (light-to-dark transition), followed by a second rising edge (dark-to-light transition), as one moves across the pattern of beams 18 transmitted at the object 20 being measured, in a left-to-right order with respect to FIG. 3.

The sample pattern shown in FIG. 3 is designed so that in the overall transmitted signal, the rising edges occur with a fixed spacing whereas the falling edges occur at either 1/3 or 2/3 of the distance between consecutive rising edges. In other words, the pattern elements each comprise a selected one of two available optical symbols, one of which has a falling edge at 1/3 the distance between consecutive rising edges, the other of which has a falling edge at 2/3 the distance between consecutive rising edges. For example, when read in the direction of the arrow 32 (left to right) in FIG. 3, the sequence 30 of bands may be represented as the binary series 0111100001, where each 0 represents a symbol in which the falling edge occurs at 1/3 of the distance between the rising edges, and each 1 represents a symbol in which the falling edge occurs at 2/3 of the distance between the rising edges. Another way of expressing the foregoing is that the more opaque or darker symbols have the value 0 and the more transparent or lighter symbols have the value 1, or can be so considered. The portion of a pattern element that is light (transparent in the mask) is referred to here as a mark, whereas the dark portion (opaque in the mask) is referred to here as a space. The transmitted signal is therefore a spatial sequence of pattern elements each consisting of a mark and adjacent space with the understanding that the signal is read consistently in a given direction; here we use the direction of arrow 32 in FIG. 3. The sequence 30 of pattern elements is thus 0111100001, where 0's represent pattern elements having narrower marks and 1's represent pattern elements having wider marks.

In FIG. 3, the pattern elements are regularly spaced, i.e. each occupies a uniform distance. However, since the surface of the object to be scanned may, in the case of a log, be assumed to be generally convex, it follows that the spacing of the pattern elements as they appear on the log's surface will vary as one proceeds from the edge to the centre of the log. To compensate for this effect, the relative distance occupied by the pattern elements of FIG. 3 could be varied as one proceeds from the end to the centre of the pattern. Alternatively, the mask 16 could be curved instead of straight.

The size and spacing of marks and spaces selected for the pattern of the mask 16 must take into account the appearance of the pattern as it strikes the scanned object. As mentioned, diffraction of the beam of light as it passes through the mask 16 will cause the light pattern on the scanned object to be somewhat fuzzy. If the pattern elements of the pattern in the mask 16 are too small, it will not be possible to discriminate between the marks and spaces of the pattern elements on the surface of the scanned object. Assuming, for example, a pattern element width of about 0.03 inches on the mask 16, the width of the projected pattern elements on the log 20 may on the average be, say, four times that of the pattern elements in the mask, or 0.12 inches. The foregoing considerations imply that surface features on the log smaller than 0.12 inches cannot be resolved, for the example under discussion.

Note also that the choice of 1/3 and 2/3 for the ratio of mark width to pattern element width is a somewhat arbitrary choice. One could have selected mark width values of, say, 1/4 and 3/4 of pattern element width. With such latter choice, it is possible that one might wish to use a slightly greater width of pattern element if the discrimination between sequential pattern elements on the log's surface were otherwise difficult to detect and measure.

The pattern applied to the scanned object need not be produced by shining light through a mask. It could, for example, be applied by means of one or more laser sources in combination with a rotating mirror (compare similar devices to be found within laser printers). The choice of pattern element parameter for mutual distinction of symbols (pattern element types) is also open to the designer—polarization differences, wavelength (colour) differences, etc. could be chosen instead of intensity/pattern element width distinctions.

An empirical approach to pattern design is recommended, taking into account the foregoing considerations.

The purpose of the receiving portion of the invention, including the imaging lens 26, the CCD array 28, and the signal processing circuitry described below, is to receive the reflected light, including the reflection of the pattern of beams of 18, from the object 20, and to analyze the received signal from the CCD array 28 in such a manner as to correlate as many received pattern elements as possible with transmitted pattern elements. Once a received pattern element is correlated with a transmitted pattern element, the coordinates of the point on the object from which that pattern element was reflected can be determined by a straightforward triangulation method such as that described with reference to FIG. 2, because that received pattern element is then associated with a known ray of light that can be traced from the laser light source 10 through a particular transparent portion of the mask 16 a determinable spot on the scanned object 20 and thence by reflection to a particular pixel element of the CCD array 28.

The selection of a specific pattern for the mask 16 can be done by trial and error or by systematic exploration of the possible patterns for a selected number of symbols and a selected total number of pattern elements in the pattern, for any given choice of symbols. For example, using the two different symbols illustrated in the mask shown in FIG. 3 and representing those symbols in the manner described above by 0 for the symbol that is 1/3 light (the space is twice as wide as the mark) and 1 for the symbol that is 2/3 light (the mark is twice as wide as the space), a straightforward selection of useful patterns can be made by testing the pattern of digits in the binary representations of all numbers less than $2^n$, where n is the total number of pattern elements in the pattern.

For example, the mask pattern shown in FIG. 3 contains an exemplary 72 pattern elements, each being a selected one of the above exemplary two available symbols. Read in the direction of arrow 32, the symbols commence with the leftmost pattern element 34 and end with rightmost pattern element 36, so that the pattern can be represented by the following binary number:

010111101111110000100001111000011111110000000100000000
11110000000111111

This pattern or any other pattern of 72 pattern elements each comprising one of two available symbols can be evaluated for use in the invention by systematically comparing each subpattern consisting of a string of binary digits to each other string of binary digits of the same length in the binary representation of the number being tested. The length of the string being compared would be started at a small number of consecutive pattern elements (at least one more than the number of different symbols) and would be increased each time the testing procedure determined that any string of that length appeared at least twice in the pattern being tested. Each length need only be tested until one string of that length fails to be unique in the pattern. Specifically, the string consisting of the first m pattern elements would be compared with the m pattern elements starting at the second digit in the pattern. If a match occurred, then no further testing at length m would be necessary and m would be increased by 1. If the two strings did not match, then the string consisting of the first m pattern elements would be compared with the m pattern elements starting at the third digit in the pattern, and so forth until the first m digits were checked against all the other strings of length m. Then the string consisting of the m symbols starting at the second digit in the pattern would be compared with the m symbols starting at the third digit in the pattern and so forth. If all subpatterns of a given minimum length m passed, then that length would be the characteristic subpattern size of the pattern being tested. After all patterns were tested, those with the smallest characteristic subpattern size would presumably be best potential for use as patterns for masks of the given total number of pattern elements using a given set of symbols, because such patterns would contain the smallest possible pattern element subsets that could be uniquely identified. For patterns composed of elements that can comprise a selected one of more than two symbols, the strings tested would be simply numbers represented in the number system whose base is equal to the number of symbols. For example, if the pattern were made up of three possible symbols, then the numbers tested would be numbers represented in the base 3 number system, and the maximum number that would need to be tested would be $3^n$.

Note that characteristic subpattern size is not per se determinative of the optical resolution of the system, because the width of a pattern element can be varied (within limits) to attempt to meet the resolution requirement of the system.

The choice of specific pattern from available candidates satisfying the criteria discussed above admits of an empirical approach, taking into account other pattern desiderata that the designer may have in mind. For example, if the designer plans to use a "least squares" fitting routine (to be described further below), it may be desirable to avoid pattern element sequences that would closely resemble other close-by pattern element sequences if one pattern element in any such sequence were not detected and identified or if a spurious (non-existent) pattern element were improperly identified.

The preferred embodiment of the optical profile scanner 11 of the invention is constructed so that mask 16 is interchangeable with masks having other patterns. Other masks might, for example, have larger or smaller pattern elements (larger or smaller transparent and opaque sections), for use with larger or smaller scanned objects, or for varying resolution so that small surface irregularities on the scanned object could be selectably detected or ignored. Alternatively, an active LCD array could be used in place of the mask 16 so that the mask pattern could be changed without physical installation of another mask. Having the ability to change the pattern element size may be desirable if the surface characteristics of the object(s) being scanned change.

It is usually desirable that the dimensions of the mark of a pattern element at the surface of the scanned object be appreciably larger than any expected area of abrupt surface discontinuity (e.g. a crack) on the surface of the scanned object, so that the reflected radiation from the object will not be subject to spurious signal spikes. However, if information such as the presence or absence of surface features such as knot holes in logs is needed for setting sawing equipment, then the pattern element size must not be larger than the surface features that must be detected, as a larger pattern element size will average out the distances over the region of the log on which the pattern element falls, causing the smaller surface features to be undetectable. On the other hand, if the surface contains sharp discontinuities on the size scale of the pattern elements, the region of the surface on which a mark or a space of a pattern element falls may be hidden by the discontinuity, causing a missing mark or space and as a result, a break in the received pattern. If this occurs too frequently, the processing routines described below may be unable to match any portion of the received pattern to the transmitted pattern, resulting in no measurement at all. The remedy is to increase the size of pattern elements used.

In a preferred embodiment of the invention, the signal and data processing apparatus for processing the received signal in the CCD array 28 is schematically illustrated in FIG. 4 and consists of three (say) printed circuit boards 76, 78, and 80 constructed out of readily available off-the-shelf components familiar to those skilled in the art. Printed circuit board 76 contains the power control circuitry 77 for the laser light source 10, and also contains the CCD driver 75 and CCD video amplifier 79 for reading out the voltages accumulated on the light-sensitive pixel elements of the CCD array 28 and for amplifying the signal consisting of the pixel sequence of those voltages. Printed circuit board 78 is constructed of discrete components and programmable logic arrays and consists of an analog-to-digital converter 69, edge detector 71, and first-in first-out memory 73. Printed circuit board 80 is a central processing unit consisting of a microcontroller 81, flash read-only memory 83, static random access memory 85, and serial and parallel input/output circuits 87.

The apparatus schematically illustrated in FIG. 4 processes the received signal to correlate received pattern elements with transmitted pattern elements in accordance with the overall process shown functionally in FIG. 5. Each part of the overall process shown in FIG. 5 takes place in portions of the apparatus illustrated in FIG. 4 as described in the following discussion.

The signal read 60 from the CCD array 28 by the CCD driver 75 and amplified by the CCD video amplifier 79 undergoes digitization 61 in the analog-to-digital converter 69. The resulting signal is the set of the intensities of the light falling at locations (pixel addresses) along the image that was formed on the CCD array 28 by the imaging lens 26. The signal then undergoes edge detection 62 in the edge detector 71 to find the pixel addresses at which the intensity of the light falling on the CCD array 28 rises and falls. The edge detector 71 uses conventional methods to differentiate and smooth the signal and then to detect peaks in the result.

Figure 6:
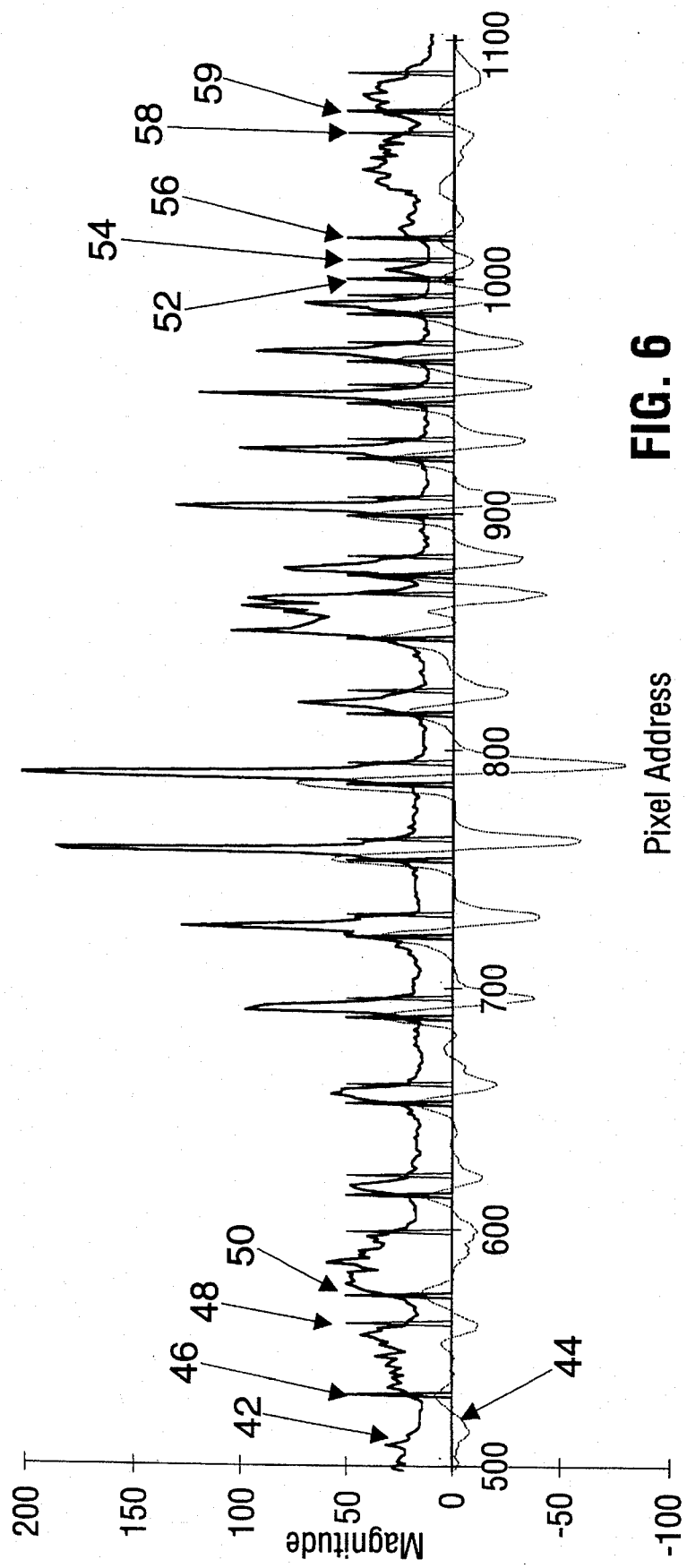
FIG. 6 is a graph depicting the processing of a sample of data, at three stages in the signal processing viz.: the raw signal amplitude; the amplitude of the processed signal after the raw signal has passed through a suitable differentiator and a noise reduction filter; and the edge detector output signal, for a specimen reflected signal generated by the scanning and detection apparatus of FIG. 1 using the mask shown in FIG. 3 and a test object.

FIG. 6 illustrates the processing carried out by the edge detector 71 as applied to the received signal corresponding to the portion of the transmitted signal originating from the portion of the mask shown in FIG. 3 from the mark of pattern element 38 to the mark of pattern element 41. The magnitude of the raw received signal 42 from the CCD array as a function of the pixel address (position on the CCD array) is plotted as a dark solid line in FIG. 6. In FIG. 6 the differentiated and smoothed received signal 44 is plotted as a light dotted line. Spikes, of which spikes 46, 48, 50, 52, 54,

56, 58, and 59 are examples, are plotted at the maxima and minima of the differentiated and smoothed received signal 44. The spikes are plotted at pixel addresses at which the received signal increases or decreases suddenly, i.e., edges of the marks and spaces of received pattern elements.

The mark of pattern element 38 (FIG. 3) corresponds to the received signal between edge 46 and edge 48. The space of pattern element 38 corresponds to the signal between edge 48 and edge 50. The mark of pattern element 40 of the mask 16 (FIG. 3) can be seen to correspond to the received signal between edge 52 and edge 54. The space of pattern element 40 corresponds to the received signal between edge 54 and edge 56. (Note that in the exemplary received signal of FIG. 6, the edge detector 71 encountered difficulties between edge 56 and edge 58, missing a falling and a rising edge, because the differentiated and smoothed signal 44 between edge 56 and edge 58 was less than the threshold for reliable edge detection. The threshold level is set by testing without the mask 16 in the window 6 to determine the noise level. The threshold is set accordingly.)

Note that, as in the case of any other system in which data are communicated, the system designer has the choice of attempting to capture all available information from the data at the risk of increased noise, or maintaining a detection threshold at a relatively high level to reject all or most noise, at the risk of failing to capture some information from the data. Again, an empirical approach is preferred, to balance the desiderata of information capture and noise suppression.

The edge detector 71 stores the pixel addresses and the direction (rising of falling) of each edge in the received signal in the first-in-first-out memory 73 to be read by the micro-controller 81 when the micro-controller 81 is ready to process the scan represented in FIG. 6.

Referring to FIG. 5, the first three functions (reading step 60, analog-to-digital conversion 61, and edge detection 62) have already been discussed. The functions symbol recovery 64, normalization 66, pattern matching 68, and ray-assignment-and-translation-to-coordinates 70 are performed by the micro-controller 81 (FIG. 4) using software and calibration data stored in the flash read-only memory 83.

The duty cycle of a pattern element is the portion that the mark of the pattern element (measured in number of consecutive pixels) is, in width, of the width (again measured in number of consecutive pixels) of the pattern element containing the mark. The normalization routine 66 involves the calculation of the apparent duty cycle of each received pattern element by dividing the difference in pixel addresses of the rising and falling edges of the mark of the received pattern element, by the difference in the pixel addresses of the rising edges that constitute the beginning and end of the received pattern element. This is illustrated in FIG. 6 for the pattern element received that corresponds to the transmitted pattern element 38 shown in FIG. 3. Suppose, for example, that the pixel address of edge 50 is 574, that of the edge 46 is 525, and that of the edge 48 is 560. The duty cycle of the received pattern element from edge 46 to edge 50 is then:

$$\frac{560-525}{574-525} = \frac{35}{49} = 0.71$$

The duty cycles of all transmitted pattern elements are determined by the design of the mask shown in FIG. 3 and are, in the illustrated embodiment, either 1/3 or 2/3.

The calculated values of duty cycles for received pattern elements will be variable due to the curvature of the surface of the object 20. The duty cycles of the received pattern elements corresponding to the portion of the transmitted signal from the mark 38 to mark 41 in FIG. 3 are plotted as bars in FIG. 7. For example, the received pattern element corresponding to transmitted pattern element 38, which in FIG. 6 is the signal from edge 46 to edge 50, has a duty cycle represented by the duty cycle bar 82 in FIG. 7. Similarly, the duty cycle of the received pattern element corresponding to transmitted pattern element 40, which received pattern element in FIG. 6 is the signal from edge 52 to edge 56, is represented by the duty cycle bar 84 in FIG. 7.

Figure 7:
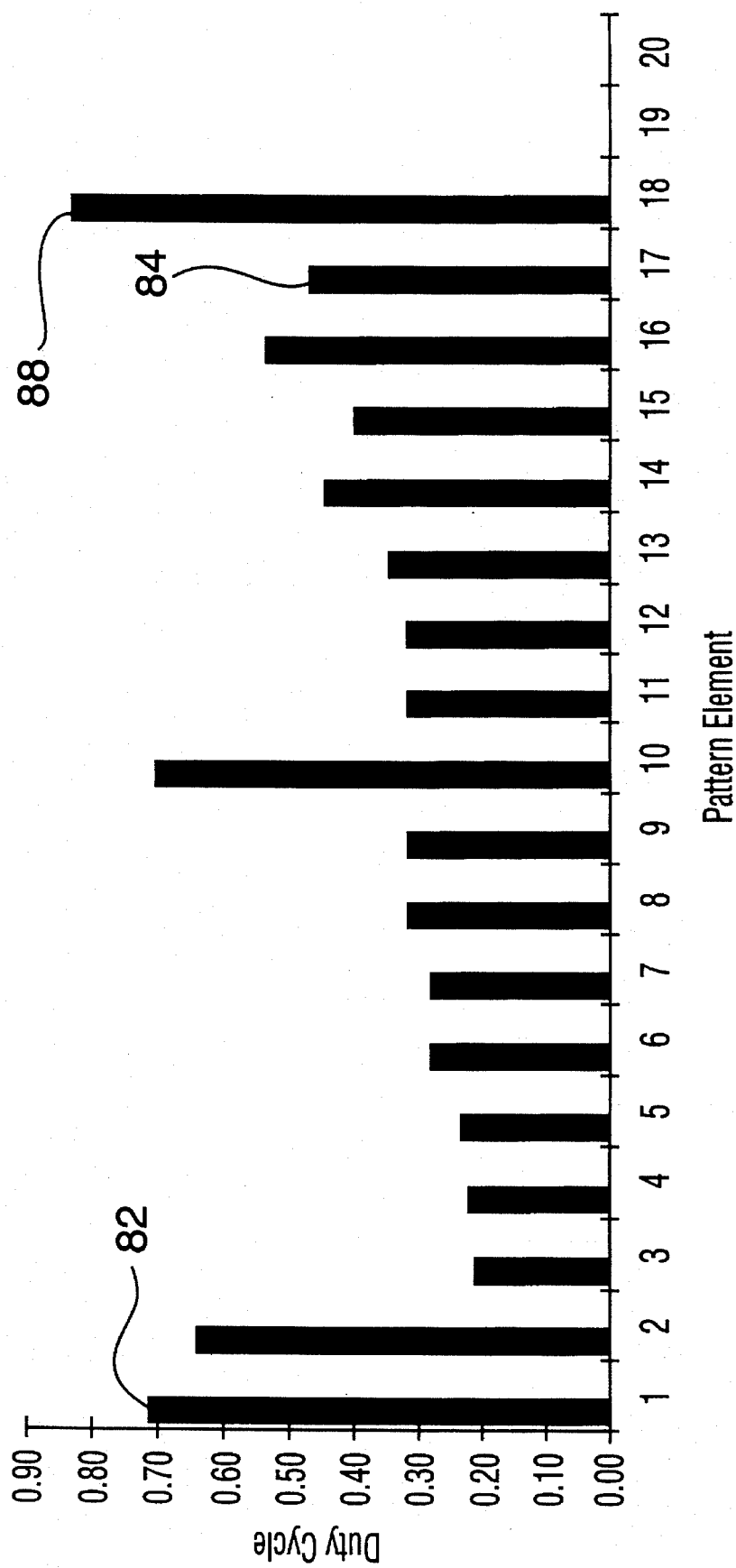
FIG. 7 is a bar graph showing duty cycles corresponding to the sample received data shown in FIG. 6, determined from the edge detector output of the edge detector of FIG. 4.

Before the pattern matching routine 68 and the ray-assignment-and-translation-to-coordinates routine 70 can be employed, the received signal pattern of duty cycles plotted in FIG. 7 is only known to correspond to some as-yet-undetermined portion of the mask pattern shown in FIG. 3, and thus to some as-yet-undetermined portion of the object 20 being scanned. A human operator might be able to see the correspondence between the received signal pattern and transmitted signal pattern easily from inspection of FIG. 3 and FIG. 7, but in a practical application, the correspondence must be found almost instantly by the signal processing apparatus, which necessitates a mathematical approach. To find which portion of the transmitted pattern corresponds to the received pattern plotted in FIG. 7, the pattern matching routine 68 is employed to attempt to fit the duty cycle pattern plotted in FIG. 7 to some determinable portion of the known duty cycle pattern of the entire transmitted signal. The duty cycle values for the transmitted pattern elements found in the mask shown in FIG. 3 are shown in FIG. 9 as a sequence of open bars, and the received duty cycle pattern is shown as a sequence of solid bars.

Figure 8:
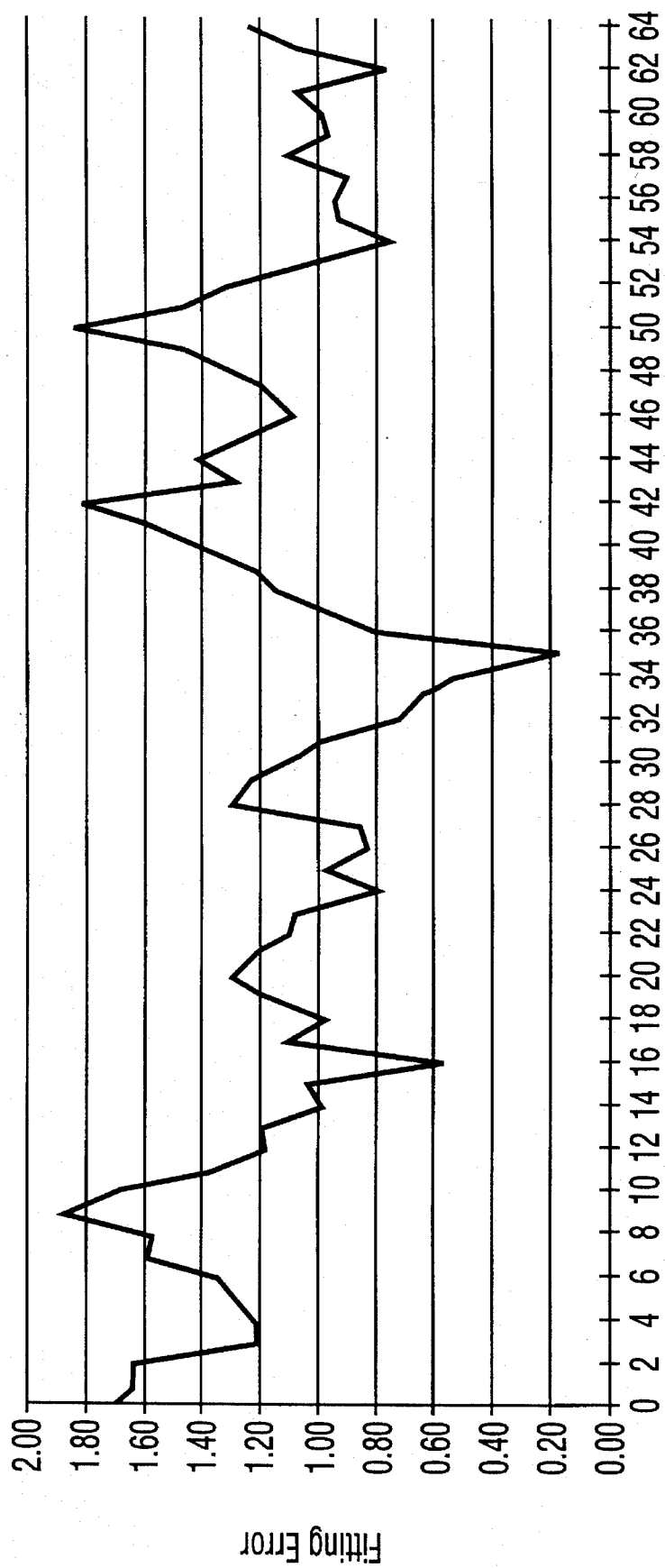
FIG. 8 is a graph showing the fitting error, calculated by a least squares technique, of the fit of the received pattern of the duty cycles shown in FIG. 7 to the transmitted pattern of duty cycles of the transmitted signal corresponding to the mask shown in FIG. 3, as a function of the offset between the first duty cycle of the pattern of duty cycles shown in FIG. 7 and the first duty cycle of the pattern of duty cycles of the transmitted signal corresponding to the mask shown in FIG. 3.
Figure 9:
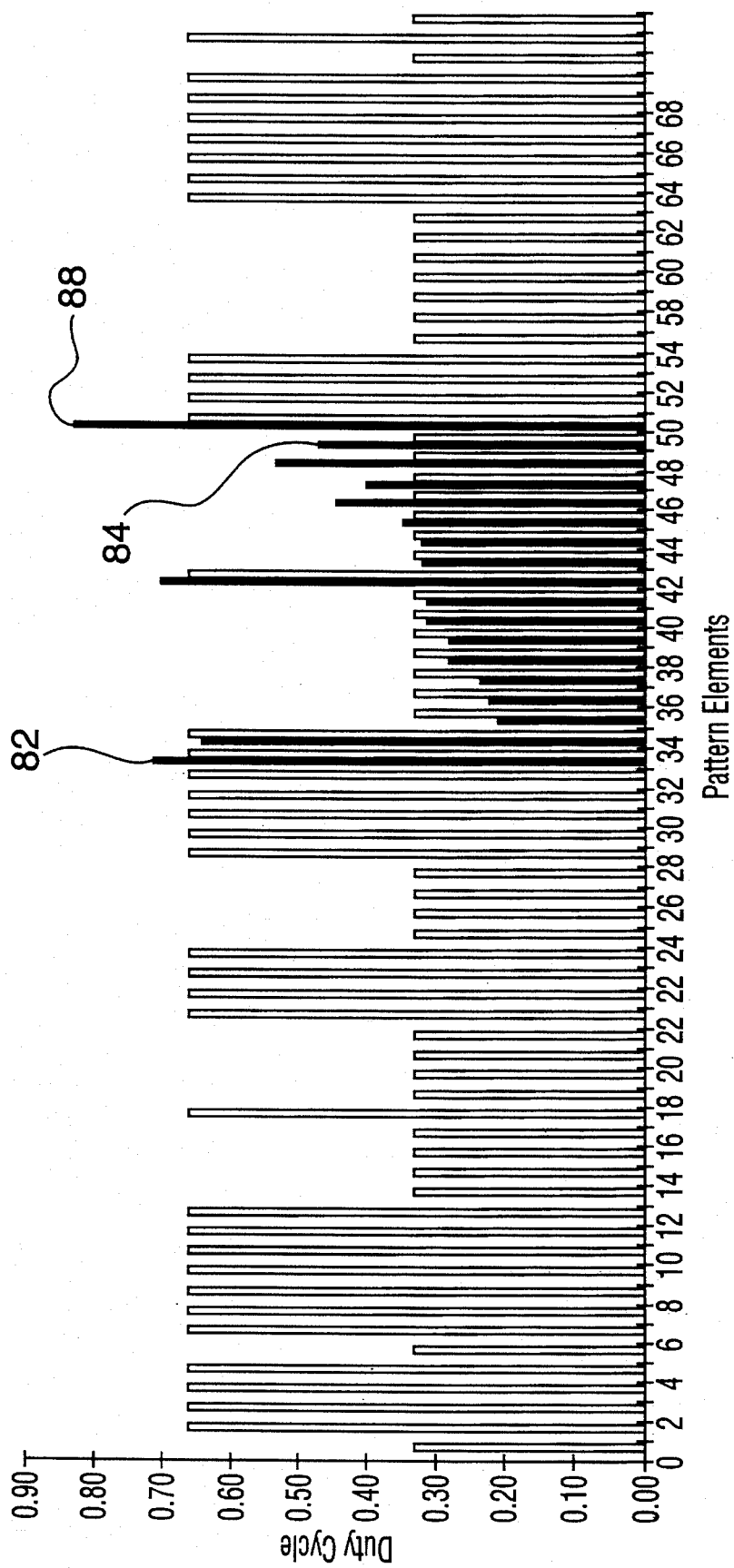
FIG. 9 is a bar graph showing the duty cycles shown in FIG. 7 superimposed upon the transmitted duty cycle pattern (shown as open bars), corresponding to the mask shown in FIG. 3, at the matching of best fit as determined from the data presented in FIG. 8.

In the illustrative example, to obtain the best fit, the micro-controller 81, using the pattern matching routine 68, attempts to match the received pattern of the 18 duty cycle values plotted in FIG. 7 to each possible sequence of 18 duty cycle values in the sequence of 72 duty cycle values for the transmitted signal shown in FIG. 9 as open bars. At each offset of the first duty cycle of the received pattern from the first duty cycle of the transmitted sequence, the micro-controller 81, using the pattern matching routine 68, calculates a measure of the closeness of the fit (the fitting error) by summing the squares of the differences between the duty cycle values of the received pattern and the subsequence of the transmitted signal being tested. Specifically, the difference between the first duty cycle of the received pattern and the first duty cycle of the subsequence of the transmitted signal being tested is squared and added to the square of the difference between the second duty cycle of the received pattern and the second duty cycle of the subsequence of the transmitted signal being tested, and so forth. The fitting error for the illustrative example is plotted in FIG. 8 as a function of the offset between the first duty cycle of the received pattern and the first duty cycle of the transmitted signal pattern. The smallest fitting error occurs at an offset of 35 pattern elements, indicating that the received pattern corresponds to a portion of the transmitted signal commencing at the 35th pattern element. The fit of the received pattern shown in FIG. 7 to the transmitted pattern obtained from the use of the mask illustrated in FIG. 3 that is obtained by this procedure is shown in FIG. 9. The black bars represent the received pattern shown in FIG. 7 and the open bars, the transmitted pattern obtained from the use of the mask shown in FIG. 3. (This "least squares" approach to correlation of received signal with transmitted signal is a preferred approach, but not the only possible approach. For example, the pairs of duty cycle values, referred to in the description of the least squares method above, could be multiplied together rather than the differences taken and then added together, in a process sometimes referred to as convolution.

As another example, a human operator could, albeit slowly, monitor the two patterns and make a visual determination of the best fit.)

Each pattern element of the transmitted signal pattern can be correlated with a known ray (beam) of light of width just sufficient to include such pattern element, that has passed through the mask 16 shown in FIG. 3. The mark of the pattern element will have passed through a known transparent band of the mask 16. Therefore, once the offset from the scan limit at which a received pattern of duty cycle values best fits the duty cycle values of the pattern element transmitted signal is found, each mark of that received pattern can be assigned to a unique ray of light that passed through a now-known transparent band of the mask 16. In calibrating the apparatus of FIG. 4, a reference table 74 (FIG. 5) is preferably used that provides the set of the angles with respect to the mask 16 and the CCD array 28 at which a beam would fall on the object 20 for each possible combination of transmitted pattern element and received pattern element pixel address on the CCD array 28. The coordinate assignment routine 70 uses the reference table 74 to assign coordinates to each pattern element of each received pattern on the surface of the object 20 being scanned.

Finally, the output routine 72 (FIG. 5) converts the coordinates of the profile of the object 20 being scanned into a form that can be transferred as serial or parallel data to the host computer 92 (FIG. 4) for further use. The input/output hardware on printed circuit board 80, in addition to carrying out output routine 72, preferably also provides input capability to allow the host computer 92 to request the next set of data for determination of the next profile in the set of profiles to be determined, which when combined, provide surface coordinate information for the entirety of the surface of the scanned object (e.g. log 20) within the field of view of the profile scanner 11.

The embodiment of the profile scanner 11 described above is assumed to incorporate a single scanning head. (A "head" would include the elements illustrated in FIG. 1) In practice, more than one such head would be disposed generally circumferentially about the periphery of the log 20 (say) to obtain an entire profile of a given log 20, or else a circumferential array of such profile scanners would be disposed about the periphery of the log 20, to achieve the same result. The host computer 92 would combine the profile information from more than one scanning head. Software to do this and to process the combined profile information data for use in the control of saw mill equipment is known and commercially available from, e.g., MPM Engineering Limited. Langley, British Columbia and Porter Engineering Limited, Richmond, British Columbia.

The symbol recovery function 64 shown in FIG. 5 is an optional feature that a person skilled in the art might wish to add to the embodiment of the invention described above to allow measurement of the surface of the scanned object under adverse conditions. Under adverse conditions, poor surface characteristics (e.g., variations in reflectivity) of the object being measured or other problems may cause the received signal to be too weak or too noisy at some pixel addresses to enable the edge detector 71 to correctly identify rising or falling edges (thereby causing edge data to be missing or spurious edge data to be produced by the edge detector 71).

The symbol recovery function 64 would involve processing the entire set of edge information from the received signal produced by the edge detector 71 to find subsets of the edge information that appear to be valid (in the sense to be described below) and then adding or removing spurious edge information to enlarge each valid subset as much as possible (permitting adjacent subsets to combine into a single valid subset where possible). To do this, the symbol recovery function 64 relies upon the premise of constant spacing of rising edges in the transmitted signal. As stated above, the spacing of rising edges is constant in the exemplary transmitted signal here being discussed because the rising edges (opaque-to-transparent transitions) are evenly spaced in the mask 16 shown in FIG. 3. The spacing of successive rising edges in the received signal is not necessarily quite as obvious as in the transmitted signal; the spacing of successive rising edges in the received signal will typically vary slowly if the scanned object (e.g. log 20) has a moderate curvature, because the direction from which the reflected pattern is viewed differs from the direction from which the transmitted pattern of beams 18 is projected. If the reflection data reveal that apparently the spacing of the rising edges appears to vary abruptly, or if a given sequence of consecutive rising or falling edges detectable by the discrimination apparatus of FIG. 4 were too widely or too narrowly spaced, then portions of the reflected pattern may be missing from the received signal data, or else spurious pattern elements may be improperly present in the received signal data, either because the curvature of the surface of the object varies too rapidly (as might happen for very small knots in a log) or because portions of the surface may be hidden from the view of the CCD array 28 (as might happen if the log conveyor occluded a part of the log, say).

The symbol recovery routine 64 acts on the set of pixel addresses of the rising edges in the received signal provided to it by the edge detector 71. The pixel addresses of the rising edges are arranged and numbered in order of increasing pixel address. To determine whether a rising edge is likely to be valid, it is assumed that the local spacing (the differences between the pixel addresses of consecutive rising edges) of valid rising edges will vary slowly, so that valid rising edges can be identified by a measure of the local rate of change of the spacing of the rising edges near each prospective valid rising edge. A variability of, say, 10 per cent from one local spacing to the next may suggest that the data are reliable, but a variability of, say, 50 per cent from one local spacing to the next may indicate unreliability of the apparent rising edge number sequence, and consequently unreliability of the apparent pattern element number sequence, which latter is what is desired to be ascertained.

A suitable measure $M_i$ of the local spacing variability has been found to be $$M_i = \frac{(A_{i+1} - A_i) - (A_i - A_{i-1})}{(A_{i+1} - A_i) + (A_i - A_{i-1})} \quad (1)$$

where:
i is the integer identifying the $i^{th}$ rising edge.
$A_i$ is the pixel address of the $i^{th}$ edge
$(A_i - A_j)$ is the difference, measured in pixels, between the pixel address of the $i^{th}$ rising edge $A_i$ and that of the $j^{th}$ rising edge $A_j$.

This measure $M_i$ has the advantage of being normalized to the average local spacing at rising edge $A_i$, because the denominator $$(A_{i+1} - A_i) + (A_i - A_{i-1})$$

is simply twice the local average spacing $$\frac{(A_{i+1} - A_{i-1})}{2}$$

near $A_i$, and the numerator is simply the difference in spacing between the increasing and the decreasing directions of pixel address, relative to the pixel address under consideration. Therefore a large $M_i$ indicates that the local spacing is changing relatively rapidly near $A_i$, suggesting unreliable data, whereas a small $M_i$ indicates a small change of local spacing, suggesting that the data are reliable in the vicinity of that pixel address.

Using the $M_i$ values, sets of rising edge pixel addresses containing at least three rising edge pixel addresses are searched for in the edge data set such that each member of a set has a value of $M_i$ less than some preselected minimum (0.25, i.e. 25 percent, has been found to be suitable). Each valid subset must then satisfy the requirement that it includes all values of $A_n$ for which $i \leq n \leq j$; $j \geq i+2$; and $M_n < 0.25$. Members of these sets are referred to here as valid rising edges, rather than the longer term valid rising edge pixel addresses.

If all rising edges in the data received from the edge detector are found to be valid, then the symbol recovery function 64 is terminated, and data processing moves on to the normalization function 66, as described above.

In some cases, however, the rising edge data corresponding to the extremities of the received pattern may be poor due to increasing curvature of the scanned object in these regions, causing rising edges to be perceived as missing. For example, in FIG. 6, a rising edge has not been detected between rising edge 56 and rising edge 58. The remainder of the data processing in the symbol recovery function 64 deals with a method of attempting to extend the sets of valid rising edges by inserting contrived rising edge data where they are expected to occur, or by removing rising edge data from where they are not expected to occur. This method uses estimates of the likely pixel addresses of rising edges, based on the trend of the spacing of rising edges already accepted as valid.

The process of extending a set of valid rising edge pixel addresses will be described here for the case of extension in the direction of increasing pixel addresses. The same procedure can be applied by extension to lower pixel addresses. The process is iterative in that if a rising edge pixel address is accepted to be valid, then the process is repeated using the newly validated pixel address as part of the set of valid rising edge pixel addresses to attempt a further extension. Only the first iteration is described in detail here.

The first step of the extension process (for extension to larger pixel address values) is to estimate the pixel address of the next rising edge beyond the largest pixel address of a valid rising edge, based on the spacing of the last three valid rising edges. The estimate found to be satisfactory is given by the equation $$E_{n+1} = V_n + (V_n - V_{n-1}) + [(V_n - V_{n-1}) - (V_{n-1} - V_{n-2})] \quad (2)$$

where $E_{n+1}$ is the estimated pixel address of the next rising edge and $V_n$ is the pixel address of the $n^{th}$ rising edge that has been accepted previously as valid. This equation estimates the expected change in spacing of rising edges as the change in spacing of the previous two rising edges. That is, $(V_n - V_{n-1})$ is the last spacing and $(V_{n-1} - V_{n-2})$ is the spacing before that. The difference between these spacings is used as an estimate of the change in spacing from $V_n$ to the expected edge $E_{n+1}$. In other words, the next expected rising edge pixel address is the last valid pixel edge address plus the spacing between the last two valid edges plus the change in spacing between the last two valid edges and the spacing between the last but one and last but two valid edges.

The edge data beyond the last edge currently accepted as valid can either have edges too closely spaced or too widely spaced to have been accepted as valid previously. To rectify the data, either some edge data must be deleted or some must be added. The rectification procedure is as follows: Having estimated the next edge address $E_{n+1}$, the measure of the closeness of the next edge $A_{n+1}$ in the observed data set of rising edge pixel addresses to the estimated edge is calculated by the ratio:

$$R_{n+1} = \frac{A_{n+1} - V_n}{E_{n+1} - V_n} \quad (3)$$

where $A_{n+1}$ is the next pixel address of a rising edge in the observed data set of rising edges after the last valid edge $V_n$ and $E_{n+1}$ is the estimated pixel address calculated as above, pursuant to equation (2).

There are now four possible cases which can occur:

Case A: If the ratio $R_{n+1}$ is 1.0 or within a preset range (±0.3 is empirically found to be useful) centered on 1.0, then $A_{n+1}$ could be a valid pixel address of a rising edge. To verify this, the ratio for the next observed rising edge $A_{n+2}$ is calculated as $R_{n+2}$ by the following equation:

$$R_{n+2} = \frac{A_{n+2} - V_n}{E_{n+1} - V_n} \quad (4)$$

If the ratio $R_{n+2}$ is closer to 1.0 than $R_{n+1}$ is, then $A_{n+2}$ is a better choice for the next valid edge, and $A_{n+1}$ is discarded from the rising edge data set. In that case, $A_{n+3}$ is also checked to make sure it is not closer than $A_{n+2}$, and so on until the observed rising edge pixel address closest in pixel address to $E_{n+1}$ is found. That observed rising edge pixel address becomes $V_{n+1}$ and all observed pixel addresses between it and $V_n$ are discarded from the valid rising edge data set as unreliable. The process described above is then repeated with the newly enlarged set of valid rising edge pixel addresses and the remaining observed rising edge data set, that now excludes previously discarded pixel address data. This rectification process continues until all remained rising edge data is tested, or another set of valid rising edges is reached.

Case B: If the ratio $R_{n+1}$ is 2.0 or within a preset range (±0.3 is empirically found to be useful) centered on 2.0, then a valid rising edge may have been missed. A new valid rising edge pixel address $V_{n+1}$ with a value equal to $E_{n+1}$ is added to the valid set, inserted after pixel address $V_n$, and the iterative rectification process is continued with the enlarged valid set.

Case C: If the ratio $R_{n+1}$ is less than 1.0 and does not qualify under case A, then $A_{n+1}$ is discarded from the set of edge data and the rectification process run through again, using data excluding $A_{n+1}$.

Case D: If the ratio $R_{n+1}$ is greater than 1.0, but does not fall under either case A or case B, then the process is ended and the valid subset is truncated. The rectification routine would then try extension to lower rising edge pixel values (so far we have been discussing extension upwards, not extension downwards) until a similar result occurred. Once extension as far as possible to lower values has been completed, the rectification routine applies the same set of procedures to any other valid subsets. Once the valid subset or subsets are extended as far as possible, the valid subset or subsets are provided to the normalization routine 66, and the remaining processing functions treat each valid subset as a separate sub-scan because the proper number of rising edges between the valid subsets is unknown.

Where contrived rising edges have been added (inserted) and no falling edges have been found, the symbol recovery routine flags all such rising edges so that the unknown pattern elements corresponding to the rising edges with unknown falling edges are not used by the fitting function.

Variants within the scope of the invention will be readily apparent to those skilled in the technology. For example, instead of a single projected pattern characterized by only one parameter, two or more patterns or two or more parameters could be used. For example, a composite projected pattern might comprise a pattern in red light and a pattern in green light. Further, more than one pattern may be projected simultaneously with the use of more than one detector. For example, patterns in differing colors using brightness and darkness may be projected simultaneously and detected simultaneously by detection systems capable of discrimination of both intensity and color.

What is claimed is:

1. A method of measuring a selected surface of an object at a distance, comprising the steps of:

(a) projecting from a first predetermined location over a predetermined angular range onto the selected surface of the object a single pattern of electromagnetic radiation comprising an array of spatially arranged and bounded pattern elements of at least two mutually distinguishable types, where each pattern element comprises at least a first and a second discrete physical characteristic, each discrete physical characteristic being associated with a discrete type of information, said pattern being selected so that any portion of the pattern of at least some preselected minimum size is distinguishable from any other portion of the pattern;

(b) receiving at a second predetermined location differing from the first predetermined location radiation reflected from the selected surface of the object and measuring (i) the directional distribution of the radiation over a scan of the object and (ii) a preselected received parameter of the reflected radiation whose variable value over the scan is measured, said received parameter being selected for discriminating between and identifying pattern elements and their types within reflection data derived from radiation originating from the projected pattern and reflected from the selected surface of the object;

(c) converting the received radiation into data representing an image of the reflection of at least a portion of the projected pattern reflected from the selected surface of the object;

(d) using the data obtained in step (c), comparing the data representing the image of the reflection with data representing the projected pattern, so as to match identifiable portions of the image with the corresponding portions of the projected pattern; and (e) calculating the spatial coordinates of the locations on the surface of the object on which each identifiable portion of the projected pattern fell from data representing (i) the first and second predetermined locations, (ii) the known directions of projection for each portion of the projected pattern matched in step (d), and (iii) measured directions pursuant to step (b), from which each corresponding portion of the image was received.

2. The method defined in claim 1, wherein the first discrete physical characteristic of each pattern element is associated with information distinguishing a pattern element from adjacent pattern elements in the pattern and the second discrete physical characteristic is associated with information providing identification of the type of each discrete pattern element.

3. The method defined in claim 2, wherein:

(i) the first discrete physical characteristic of each pattern element is a preselected relatively abrupt change in a characteristic of the projected radiation across the spatial boundaries of the pattern element, said change producing in the reflected radiation an identifiable change in the preselected parameter;

(ii) each pattern element is comprised of spatially discrete first and second portions, the projected radiation in the first portion producing in the received radiation a value of the preselected parameter differing from that produced by the second portion;

(iii) said portions having a ratio in spatial extent selected to be discernibly different for each type of pattern element; and (iv) the second discrete physical characteristic of a pattern element is said selected ratio.

4. The method defined in claim 3, wherein said selected ratio for a pattern element is selected from the group consisting of about 2 to 1 and about 1 to 2.

5. The method defined in claim 3, wherein said selected ratio for a pattern element is selected from the group consisting of about 3 to 1 and about 1 to 3.

6. The method defined in claim 2, wherein:

(i) each pattern element comprises a binary subpattern of at least three substantially equal portions beginning with a start portion and ending with an end portion distinguishable from the start portion, whereby the start portion and other portions mutually indistinguishable from the start portion may be denoted by 1 in the binary subpattern and the end portion and other portions mutually indistinguishable from the end portion may be denoted by 0 in the binary subpattern;

(ii) the first discrete physical characteristic of a pattern element is the location of the start portion in the pattern;

(iii) the binary subpattern comprises a first contiguous sequence of at least one 1 including the 1 denoting the start portion and a second contiguous sequence of at least one 0 including the 0 denoting the end portion; and (iv) the second discrete physical characteristic is the binary subpattern.

7. The method defined in claim 6, wherein the binary subpattern for each pattern element is selected from the group consisting of 100 and 110.

8. The method defined in claim 6, wherein the binary subpattern for each pattern element is selected from the group consisting of 1000, 1100, and 1110.

9. The method defined in claim 2, wherein:

(i) the first discrete physical characteristic of each pattern element is a preselected relatively abrupt change in a characteristic of the projected radiation across the spatial boundaries of the pattern element, said change producing in the reflected radiation an identifiable change in the preselected parameter;

(ii) each pattern element is comprised of spatially discrete first and second portions, the projected radiation in the first portion producing in the received radiation a value of the preselected parameter of the reflected radiation differing from that produced by the second portion, thereby providing a ratio of the value of the preselected parameter in the reflected radiation produced by the projected radiation in the first portion to the value of the preselected parameter in the reflected radiation produced by the projected radiation in the second portion;

(iii) the values of said ratio are selected to be discernibly different for each type of pattern element; and (iv) the second discrete physical characteristic of a pattern element is said ratio.

10. In a method of measuring a selected surface of an object at a distance, of the type wherein electromagnetic radiation having a structured pattern is projected from a first predetermined location over a predetermined angular range onto the selected surface of the object; electromagnetic radiation reflected from the selected surface of the object is received at a second predetermined location differing from the first predetermined location, and the directional distribution of the received electromagnetic radiation is measured; whereby the coordinates of portions of the selected surface are calculated, permitting the surface profile of the selected surface to be simulated; the improvement comprising:

(a) projecting from a first predetermined location over a predetermined angular range onto the selected surface of the object a single structured pattern of electromagnetic radiation comprising an array of spatially arranged pattern elements selected from at least two mutually distinguishable types, where each pattern element comprises at least a first and a second discrete physical characteristic, each discrete physical characteristic being associated with a discrete type of information, said pattern being selected so that any portion of the pattern of at least some preselected minimum size is distinguishable from any other portion of the pattern;

(b) receiving at a second predetermined location differing from the first predetermined location electromagnetic radiation reflected from the selected surface of the object and measuring over a scan of the object a preselected parameter of the reflected radiation for discriminating between pattern elements of the electromagnetic radiation originating from the projected pattern and reflected from the selected surface of the object;

(c) converting the received electromagnetic radiation into data representing the distribution over a scan of said preselected parameter associated with an image of the reflection of at least a portion of the projected pattern reflected from the selected surface of the object;

(d) using the data obtained in step (c), comparing the scan distribution data associated with the image of the reflection with data representing the projected pattern, so as to match identifiable portions of the image with corresponding portions of the projected pattern;

whereby the coordinates of the locations on the surface of the object on which each identifiable portion of the projected pattern fell are correlated with the matched data obtained from step (d).

11. A method of measuring a surface portion of an object at a distance, comprising the steps of:

(a) illuminating the object from a first predetermined location over a predetermined angular range with a single projected thin generally fan-shaped beam of electromagnetic radiation that spatially varies along its wider dimension in a pattern comprising a spatially arranged sequence of pattern elements of at least two mutually distinguishable types, where each pattern element comprises at least a first and a second discrete physical characteristic, each discrete physical characteristic being associated with a discrete type of information, said pattern being selected so that any portion of the pattern of at least some preselected minimum size is distinguishable from any other portion of the pattern;

(b) detecting electromagnetic radiation reflected from the surface portion of the object over a scan of the object;

(c) converting the detected electromagnetic radiation into data representing the distribution over a scan of a preselected parameter of the reflected radiation associated with an image of the reflection of at least a portion of the projected pattern reflected from the object;

(d) correlating each such distinguishable portion of the projected pattern with the reflection data obtained from step (c) by comparing data representing the pattern of the illuminating beam with the said reflection data, so as to establish a match of an identifiable portion of the reflected radiation and a corresponding portion of the illuminating beam whereby the portion of the surface of the object from which the reflected radiation has been reflected is ascertained; and (e) computing distance data for a scan of the object and coordinating said distance data with the matched reflected radiation data, thereby generating profile data representing the profile of at least a portion of the scanned object.

12. A method of measuring a selected surface of an object at a distance, comprising the steps of:

(a) projecting from a first predetermined location over a predetermined angular range onto the selected surface of the object a single pattern of electromagnetic radiation comprising an array of spatially arranged pattern elements of at least two mutually distinguishable types, where each pattern element comprises at least two contrasting pattern element segments, each of at least two selected ones of said segments representing information of a discrete type; said pattern being selected so that any portion of the pattern of at least some preselected minimum size is distinguishable from any other portion of the pattern;

(b) receiving at a second predetermined location differing from the first predetermined location radiation reflected from the selected surface of the object and measuring (i) the directional distribution of the radiation over a scan of the object and (ii) a preselected parameter of the reflected radiation whose variable value over the scan is measured, said preselected parameter being selected for discriminating between and identifying pattern elements and their types within reflection data derived from radiation originating from the projected pattern and reflected from the selected surface of the object;

(c) the received radiation into data representing an image of the reflection of at least a portion of the projected pattern reflected from the selected surface of the object;

(d) using the data obtained in step (c), comparing the data representing the image of the reflection with data representing the projected pattern, so as to match identifiable portions of the image with the corresponding portions of the projected pattern; and (e) calculating the spatial coordinates of the locations on the surface of the object on which each identifiable portion of the projected pattern fell from data representing (i) the first and second predetermined locations, (ii) the known directions of projection for each portion of the projected pattern matched in step (d), and (iii) measured directions pursuant to step (b), from which each corresponding portion of the image was received.

13. Apparatus for measuring a surface portion of an object at a distance, comprising:

(a) an illuminator for illuminating the object by projecting from a first predetermined location over a predetermined angular range onto the surface portion of the object an illuminating beam comprising a single spatially varied pattern of electromagnetic radiation selected so that any portion of the pattern of at least some preselected minimum size is distinguishable from any other portion of the pattern, said pattern comprised of an array of spatially arranged pattern elements of at least two mutually distinguishable types, where each pattern element comprises at least a first and a second discrete physical characteristic, each discrete physical characteristic being associated with a discrete type of information;

(b) a detector for receiving electromagnetic radiation reflected from the surface portion of the object;

(c) a converter for converting the received electromagnetic radiation into computer-readable digital reflection data;

(d) a discriminator for processing said data for correlating each said distinguishable portion of the projected pattern with the image of its reflection by comparing transmission data representing the pattern of the illuminating beam with the reflection data, so as to establish a match of an identifiable portion of the reflected radiation and a corresponding portion of the illuminating beam, whereby the portion of the surface of the object from which the reflected radiation has been reflected is ascertained;

(e) a coordinate calculator for computing the spatial coordinates of the portion of that surface of the object on which each distinguishable portion of the pattern falls; and (f) a profile generator for computing and generating distance data correlated with the computed spatial coordinates of the scanned object thereby to generate data representing the profile of at least a portion of the scanned object.

14. Apparatus for measuring the spatial coordinates of a selected portion of the surface of an object to be measured, comprising:

a laser source;

a cylindrical lens receiving light from the laser source and generating a fan-shaped beam of light;

a mask formed as a pattern comprising a spatially ordered array of pattern elements each including a transparent region followed by an opaque region selected so that each pattern element is identifiable as being of a selected one of at least two types of pattern elements mutually distinguishable from one another by means of the ratio in spatial extent of the transparent and opaque regions therein;

said pattern being selected so that any portion of the pattern of at least some preselected minimum size is distinguishable from any other portion of the pattern;

said laser source, cylindrical lens and mask being spatially disposed to project the pattern of the mask onto the selected surface of the object to be measured;

an image sensor having a generally linear array of sensing elements lying generally in the plane of the fan-shaped beam of light, for receiving light reflected from the object to be measured;

said image sensor generating an electronic signal whose amplitude varies over the linear array of sensing elements in accordance with the variation in space of the intensity of the light reflected from the object and received by the image sensor;

a converter for converting the electronic signal produced by the image sensor into computer-readable digital reflection data;

means for identifying within the reflection data information representative of a reflection sequence of pattern elements of the projected pattern;

means for comparing the reflection sequence of pattern elements with each projected sequence of pattern elements of the mask of a sequence length equal to the length of the reflection sequence;

whereby the image data may be correlated with a discrete identified portion of the surface of the object being measured; and using the principle of triangulation, determining the angles of incidence and reflection of light projected upon and reflected from the selected surface of the object being measured, and using the known geometry of said apparatus including the laser and image sensor thereby to compute the spatial coordinates of the identified portion of the surface of the object;

whereby the spatial coordinates thus computed are correlated uniquely with the pattern projected onto the surface, thereby to generate reliable spatial coordinate information of the identified portion of the surface of the object being measured.

15. Apparatus for measuring a selected surface of an object at a distance comprising a laser source;

a cylindrical lens through which light from the laser source passes thereby to form a fan-shaped beam of light;

a first mirror for reflecting the fan-shaped beam of light toward the selected surface of the object to be measured;

a mask interposed between the first mirror and the object to be measured and having thereon and superimposing upon the fan-shaped beam of light a single pattern comprised of an array of sequential pattern elements;

each pattern element being a selected one of at least two pattern element types each including a transparent region followed by an opaque region, said pattern elements mutually distinguishable from one another by means of the ratio in spatial extent of the transparent and opaque regions therein;

said pattern being selected so that any portion of the pattern of at least some preselected minimum size is distinguishable from any other portion of the pattern;

a second mirror for receiving light reflected from the selected surface of the object;

an image lens for focusing light reflected from the second mirror;

an image sensor having a generally linear array of sensing elements lying generally in the plane of the fan-shaped beam of light;

said image sensor receiving light reflected from the second mirror that is passed through the image lens;

said image sensor being located relative to the second mirror and image lens to receive a focused image of light reflected from the selected surface of the object;

said image sensor generating a received signal whose magnitude over the linear array of sensing elements is proportional to the intensity of the light reflected from the selected surface of the object from one extremity of the selected surface to the other over a scan;

a converter for converting the received signal produced by the image sensor to computer-readable digital reflection data in a sequence correlatable with the sequence of variation of magnitude of the received signal;

pattern element identification means for identifying within said reflection data information representing a sequence of pattern elements of the reflected pattern emanating from the selected surface of the object to be measured;

comparison means for comparing the identified series of pattern elements in the reflection data with each sequence of pattern elements in the transmitted data of sequence length equal to the length of the sequence of reflected pattern element data;

means for matching the apparent sequence of pattern elements in the reflection data to the projected pattern element data to obtain the best match of reflected pattern element data with the transmitted sequence of pattern elements thereby to correlate the reflection data with an identified portion of the object being measured;

means for computing for each intercept of a pattern element with the selected surface of the object being measured the spatial coordinates of that intercept, using the principal of triangulation, measured angles of incidence and reflection of the projected and reflected patterns, and the known geometry of the apparatus including the mirrors, lenses, laser source, and image sensor; thereby to derive data representing the spatial coordinates of the identifiable portion of the object to be measured.

16. Apparatus as defined in claim 15, wherein the transparent and opaque regions comprise sequential parallel bands alternating between opaque and transparent bands.

17. Apparatus as defined in claim 16, wherein all pattern elements have substantially identical width.

18. Apparatus as defined in claim 17, wherein the pattern element identification means comprises an edge detector for detecting rising and falling edges of the intensity of the reflected light received by the image sensor as embodied in the reflection.

19. Apparatus as defined in claim 18, wherein the pattern elements in the reflection data are identified by comparing, for each successive rising edge, the duty cycle between a rising and consecutive falling edge with the distance between successive rising edges including the duty cycle, thereby to correlate the apparent pattern element type of each received pattern element in the sequence with an identifiable one of the transmitted pattern element types.

20. Apparatus as defined in claim 19, wherein reflection data representing the detected rising and falling edges are tested for validity in accordance with the trend in the spacing of the rising edges, and the reflection data are then rectified by discarding selected spurious rising edges and inserting selected contrived rising edges where the trend of the spacing indicates that spurious edges or missed edges have contaminated the reflection data.

21. Apparatus for measuring a selected surface of an object at a distance, comprising:

(a) a projector for projecting from a first predetermined location over a predetermined angular range onto the selected surface of the object a single pattern of electromagnetic radiation comprising an array of spatially arranged pattern elements of at least two mutually distinguishable types, where each pattern element comprises at least a first and a second discrete physical characteristic, each discrete physical characteristic being associated with a discrete type of information, said pattern being selected so that any portion of the pattern of at least some preselected minimum size is distinguishable from any other portion of the pattern;

(b) a detector for receiving at a second predetermined location differing from the first predetermined location radiation reflected from the selected surface of the object and measuring (i) the directional distribution of the radiation over a scan of the object and (ii) a preselected received parameter of the reflected radiation whose variable value over the scan is measured, said received parameter being selected for discriminating between and identifying pattern elements and their types within reflection data derived from radiation originating from the projected pattern and reflected from the selected surface of the object;

(c) a converter for converting the received radiation into data representing an image of the reflection of at least a portion of the projected pattern reflected from the selected surface of the object;

(d) a discriminator for comparing the data generated by the converter as representing the image of the reflection with data representing the projected pattern, so as to match identifiable portions of the image with the corresponding portions of the projected pattern; and (e) a coordinate calculator for calculating the spatial coordinates of the locations on the surface of the object on which each identifiable portion of the projected pattern fell, from data representing (i) the locations of the projector and detector, (ii) the known directions of projection for each portion of the projected pattern matched in the discriminator, and (iii) measured directions pursuant to those received by the detector, from which each corresponding portion of the image was received.

22. Apparatus as defined in claim 21, wherein the radiation is light.

23. Apparatus as defined in claim 21, wherein the types of pattern elements are distinguished from one another by means of a selected structured radiation parameter of the projected electromagnetic radiation whose value is discernibly different for each of the said types, and the reflection of which pattern elements from the object includes over the scan a series of values of the selected received parameter.

24. Apparatus as defined in claim 23, wherein the structured radiation parameter is polarization.

25. Apparatus as defined in claim 23, wherein the structured radiation parameter is wavelength.

26. Apparatus as defined in claim 23, wherein the structured radiation parameter is intensity.

27. Apparatus as defined in claim 22, wherein the projected electromagnetic radiation comprises a series of pattern elements of predetermined width, and the structured radiation parameter is the relative width within each pattern element of a selected relative value of a measurable characteristic of the radiation as compared with the width of the pattern element as a whole.

28. Apparatus as defined in claim 27, wherein the measurable characteristic is intensity.

29. Apparatus as defined in claim 23, wherein each pattern element is divided into a low-intensity portion of a first variable width and a high-intensity portion of a second variable width, and wherein the structured radiation parameter is the ratio of the width of the high intensity portion of the pattern element to the width of the pattern element.

30. Apparatus as defined in claim 29, wherein the received parameter comprises the intensity within a predetermined bandwidth of the radiation reflected from the object, said predetermined bandwidth overlapping at least a known portion of the bandwidth of the projected radiation.

31. Apparatus as defined in claim 30, wherein the radiation is light.

32. Apparatus as defined in claim 31, comprising means for coordinating means (a) through (e) to perform a series of scans of adjacent surface portions of the object.

33. Apparatus as defined in claim 23, wherein each pattern element comprises a mark and a contiguous space, each projected pattern element is of a width selected to be substantially uniform as projected, and wherein the ratio of the width of the mark to the space is selected for each pattern element to be one of at least two mutually distinguishable values.

34. Apparatus as defined in claim 23, wherein each pattern element comprises a mark and a contiguous space, each projected pattern element is of a width selected to be substantially uniform as the pattern falls upon the object, and wherein the ratio of the width of the mark to the space is selected for each pattern element to be one of at least two mutually distinguishable values.

35. Apparatus as defined in claim 23, wherein each pattern element comprises a mark and a contiguous space, each projected pattern element is of a width selected according to a predetermined scheme, and wherein the ratio of the width of the mark to the space is selected for each pattern element to be one of at least two mutually distinguishable values.

36. Apparatus as defined in claim 35, wherein the received parameter comprises the intensity of the radiation reflected from the object.

37. Apparatus as defined in claim 35, wherein the received parameter comprises the intensity within a predetermined bandwidth of the radiation reflected from the object, said predetermined bandwidth overlapping at least a known portion of the bandwidth of the projected radiation.

38. Apparatus as defined in claim 37 wherein means (c) and (d) comprise an edge detector for edge detection of rising and falling edges of amplitude data representative of the intensity of the electromagnetic radiation received from sequential portions of the surface of the scanned object over the scan; computing means for computation of the duty cycle comprising the ratio of the signal width between a rising edge and the next following falling edge to the signal width between that rising edge and the next following rising edge; and comparison means for comparing the ratio of the width of an apparent mark to the width of an apparent space in each apparent received pattern element with contiguous sequences of pattern elements in the projected pattern of sequence length equal to the apparent sequence length of the received pattern element over the scan so as to correlate the spatial sequence of received pattern elements detected within the reflection data with a corresponding sequence of pattern elements in the pattern projected onto the object being measured.

39. Apparatus as defined in claim 38 wherein means (d) further comprises means for applying a pattern matching routine to a series of difference data representing the difference between the reflection data and a corresponding series of portions of the data representing the projected pattern, said portions being selected to comprise a contiguous series of pattern elements equal in number to the number of apparent pattern elements contained in the image of the reflection.

40. Apparatus as defined in claim 39, wherein the pattern matching routine comprises a least squares fitting routine.

41. Apparatus as defined in claim 39 wherein the radiation is light.

42. Apparatus as defined in claim 41, comprising means for coordinating means (a) through (e) to perform a series of scans of adjacent surface portions of the object.

43. Apparatus as defined in claim 42, wherein the pattern elements in the reflection data are identified by comparing, for each successive rising edge, the duty cycle between a rising and consecutive falling edge with the distance between successive rising edges including the duty cycle, thereby to correlate the apparent pattern element type of each received pattern element in the sequence with an identifiable one of the transmitted pattern element types.

44. Apparatus as defined in claim 39, additionally comprising:

(f) means for recognizing and deriving at least one apparent sequence of pattern elements from the reflected pattern signal data;

(g) means for iteratively comparing a selected pattern parameter of selected individual ones of the apparent received pattern elements in said apparent sequence relative to a prediction for each such selected apparent received individual pattern element based upon the sequence of pattern elements in the transmitted pattern and based upon the values of the selected pattern parameter for selected apparent received pattern elements adjacent such selected individual pattern element; and (h) means for selecting for recomputing the sequence number value of selected ones of the pattern elements recognized in the received pattern element data based upon the result of the comparison performed by the comparison means; thereby to generate a validated sequence of pattern elements.

45. Apparatus as defined in claim 44, wherein the selected pattern parameter is the width of the mark of a pattern element.

46. Apparatus as defined in claim 45, wherein means (h) comprises means for inserting an additional pattern element in sequence before a given apparent pattern element in the received signal data when the observed apparent width of the given apparent pattern element is greater than the average apparent pattern element width of selected pattern elements in the vicinity of the given pattern element by more than a preselected fraction of said average width.

47. Apparatus as defined in claim 45, wherein means (h) comprises means for deleting a given apparatus pattern element from an observed sequence of apparent pattern elements in the received signal data when the observed apparent width of the given apparent pattern element is less than the average apparent pattern element width of selected pattern elements in the vicinity of the given pattern element by more than a preselected fraction of said average width.

48. Apparatus as defined in claim 45, wherein means (h) comprises means for inserting an additional pattern element in sequence before a given apparent pattern element in the received signal data when the observed apparent width of the given apparent pattern element is greater than the average apparent pattern element width of selected pattern elements in the vicinity of the given pattern element by more than a preselected fraction of said average width; and means for deleting a given apparatus pattern element from an observed sequence of apparent pattern elements in the received signal data when the observed apparent width of the given apparent pattern element is less than the average apparent pattern element width of selected pattern elements in the vicinity of the given pattern element by more than a preselected fraction of said average width.

49. Apparatus as defined in claim 39, wherein each pattern element as it falls on the object is of dimensions large compared to the dimensions of expected small aberrations in the profile of the object.

50. Apparatus as defined in claim 21, wherein each pattern element as it falls on the object is of dimensions large compared to the dimensions of expected small aberrations in the profile of the object.

51. Apparatus defined in claim 21, wherein the first discrete physical characteristic of each pattern element is associated with information distinguishing a pattern element from adjacent pattern elements in the pattern and the second discrete physical characteristic is associated with information providing identification of the type of each discrete pattern element.

52. Apparatus defined in claim 51, wherein:
    (i) the first discrete physical characteristic of each pattern element is a preselected relatively abrupt change in a characteristic of the projected radiation across the spatial boundaries of the pattern element, said change producing in the reflected radiation an identifiable change in the preselected parameter;
    (ii) each pattern element is comprised of spatially discrete first and second portions, the projected radiation in the first portion producing in the received radiation a value of the preselected parameter differing from that produced by the second portion;
    (iii) said portions having a ratio in spatial extent selected to be discernibly different for each type of pattern element; and
    (iv) the second physical characteristic of a discrete pattern element is said selected ratio.

53. Apparatus defined in claim 52, wherein said selected ratio for a pattern element is selected from the group consisting of about 2 to 1 and about 1 to 2.

54. Apparatus defined in claim 52, wherein said selected ratio for a pattern element is selected from the group consisting of about 3 to 1 and about 1 to 3.

55. Apparatus defined in claim 51, wherein:
    (i) each pattern element comprises a binary subpattern of at least three substantially equal portions beginning with a start portion and ending with an end portion distinguishable from the start portion, whereby the start portion and other portions mutually indistinguishable from the start portion may be denoted by 1 in the binary subpattern and the end portion and other portions mutually indistinguishable from the end portion may be denoted by 0 in the binary subpattern;
    (ii) the first discrete physical characteristic of a pattern element is the location of the start portion in the pattern;
    (iii) the binary subpattern comprises a first contiguous sequence of at least one 1 including the 1 denoting the start portion and a second contiguous sequence of at least one 0 including the 0 denoting the end portion; and
    (iv) the second discrete physical characteristic is the binary subpattern.

56. The method defined in claim 55, wherein the binary subpattern for each pattern element is selected from the group consisting of 100 and 110.

57. The method defined in claim 55, wherein the binary subpattern for each pattern element is selected from the group consisting of 1000, 1100, and 1110.

58. The method defined in claim 51, wherein:
    (i) the first discrete physical characteristic of each pattern element is a preselected relatively abrupt change in a characteristic of the projected radiation across the spatial boundaries of the pattern element, said change producing in the reflected radiation an identifiable change in the preselected parameter;
    (ii) each pattern element is comprised of spatially discrete first and second portions, the projected radiation in the first portion producing in the received radiation a value of the preselected parameter differing from that produced by the second portion, thereby providing a ratio of the value of the preselected parameter in the reflected radiation produced by the projected radiation in the first portion to the value of the preselected parameter in the reflected radiation produced by the projected radiation in the second portion;
    (iii) the values of said ratio are selected to be discernibly different for each type of pattern element; and
    (iv) the second discrete physical characteristic of a pattern element is said ratio.

59. In or for use with apparatus for measuring a selected surface of an object at a distance, of the type having a projector for projecting electromagnetic radiation having a structured pattern from a first predetermined location over a predetermined angular range onto the selected surface of the object; a detector at a second predetermined location differing from the first predetermined location for receiving electromagnetic radiation reflected from the selected surface of the object, and measuring means for measuring the directional distribution of the received electromagnetic radiation; whereby the coordinates of portions of the selected surface are calculated, permitting the surface profile of the selected surface to be simulated; the improvement comprising:
    (a) a projector for projecting from a first predetermined location over a predetermined angular range onto the selected surface of the object a single structured pattern of electromagnetic radiation comprising spatially varied pattern elements of at least two mutually distinguishable types, where each pattern element comprises at least a first and a second discrete physical characteristic, each discrete physical characteristic being associated with a discrete type of information; said pattern being selected so that any portion of the pattern of at least some preselected minimum size is distinguishable from any other portion of the pattern;
    (b) a detector for detecting at a second predetermined location differing from the first predetermined location electromagnetic radiation reflected from the selected surface of the object and measuring over a scan of the object a preselected received parameter of the reflected radiation for discriminating between pattern elements of the electromagnetic radiation originating from the projected pattern and reflected from the selected surface of the object;
    (c) a converter for converting the detected electromagnetic radiation into data representing the distribution over a scan of said preselected received parameter of the reflected radiation associated with an image of the reflection of at least a portion of the projected pattern reflected from the selected surface of the object;
    (d) a discriminator for comparing the scan distribution data associated with the image of the reflection with data representing the projected pattern, so as to match identifiable portions of the image with the corresponding portions of the projected pattern;
whereby the coordinates of the locations on the surface of the object on which each identifiable portion of the projected pattern fell are correlated with the matched data.

60. Apparatus as defined in claim 59, comprising means for coordinating means (a) through (e) to perform a series of scans of adjacent surface portions of the object.

61. Apparatus as defined in claim 59, wherein the types of pattern elements are distinguished from one another by means of a selected structured parameter of the projected electromagnetic radiation whose value is discernably different for each of the said types, and the reflection of which pattern elements from the object includes over the scan a series of values of the received parameter.

62. Apparatus as defined in claim 61, wherein each pattern element is divided into a low-intensity portion of a first variable width and a high-intensity portion of a second variable width, and wherein the structured radiation parameter is the ratio of the width of the high intensity portion of the pattern element to the width of the pattern element.

63. Apparatus as defined in claim 62, wherein the received parameter comprises the intensity within a predetermined bandwidth of the radiation reflected from the object, said predetermined bandwidth overlapping at least a known portion of the bandwidth of the projected radiation.

64. Apparatus as defined in claim 63, wherein the radiation is light.

65. Apparatus as defined in claim 63 wherein means (c) and (d) comprise an edge detector for edge detection of rising and falling edges of amplitude data representative of the intensity of the electromagnetic radiation received from sequential portions of the surface of the scanned object over the scan;

computing means for computation of the duty cycle comprising the ratio of the signal width between a rising edge and the next following falling edge to the signal width between that rising edge and the next following rising edge; and comparison means for comparing the ratio of the width of an apparent mark to the width of an apparent space in each apparent received pattern element with contiguous sequences of pattern elements in the projected pattern of sequence length equal to the apparent sequence length of the received pattern element over the scan so as to correlate the spatial sequence of received pattern elements detected within the reflection data with a corresponding sequence of pattern elements in the pattern projected onto the object being measured.

66. Apparatus as defined in claim 65 wherein means (d) comprises means for applying a pattern matching routine to a series of difference data representing the difference between the reflection data and a corresponding series of portions of the data representing the projected pattern, said portions being selected to comprise a contiguous series of pattern elements equal in number to the number of apparent pattern elements contained in the image of the reflection.

67. Apparatus as defined in claim 66 comprising testing means for testing the validity of data representing the detected rising and falling edges in accordance with the trend in the spacing of the rising edges, and rectification means for rectifying the reflection data by discarding selected spurious rising edges and inserting selected contrived rising edges where the trend of the spacing indicates that spurious edges or missed edges have contaminated the reflection data.

68. Apparatus as defined in claim 59, wherein each pattern element as it falls on the object is of dimensions large compared to the dimensions of expected small aberrations in the profile of the object.

69. Apparatus for measuring a surface portion of an object at a distance, comprising:

(a) an illuminator for illuminating the object by projecting from a first predetermined location over a predetermined angular range onto the surface portion of the object a single illuminating beam comprising a projected thin generally fan-shaped beam of electromagnetic radiation that spatially varies along its wider dimension in a pattern comprising a spatially arranged sequence of pattern elements of at least two mutually distinguishable types, where each pattern element comprises at least a first and a second discrete physical characteristic, each discrete physical characteristic being associated with a discrete type of information, said pattern being selected so that any portion of the pattern of at least some preselected minimum size is distinguishable from any other portion of the pattern;

(b) a detector for receiving electromagnetic radiation reflected from the surface portion of the object over a scan of the object;

(c) a converter for converting the received electromagnetic radiation into data representing the distribution over a scan of a preselected parameter of the reflected radiation associated with an image of the reflection of at least a portion of the projected pattern reflected from the surface portion of the object;

(d) a discriminator for correlating each such distinguishable portion of the projected pattern with the reflection data generated by the converter by comparing data representing the pattern of the illuminating beam with the said reflection data, so as to establish a match of an identifiable portion of the reflected radiation and a corresponding portion of the illuminating beam whereby the portion of the surface of the object from which the reflected radiation has been reflected is ascertained; and (e) a profile generator for computing distance data for a scan of the object and coordinating said distance data with the matched reflected radiation data thereby generating profile data representing the profile of at least a portion of the scanned object.

70. In or for use in apparatus for measuring a selected surface of an object at a distance that includes:

(a) a projector for projecting from a first predetermined location over a predetermined angular range onto the selected surface of the object a pattern of electromagnetic radiation;

(b) a detector for receiving at a second predetermined location differing from the first predetermined location radiation reflected from the selected surface of the object and measuring radiation reflected from the object including the directional distribution of the electromagnetic radiation over a scan of the object;

(c) a converter for converting the received electromagnetic radiation into data representing an image of the reflection of at least a portion of the projected pattern reflected from the selected surface of the object; and (d) a coordinate calculator for calculating the spatial coordinates of the locations on the surface of the object on which each identifiable portion of the projected pattern fell, from data representing (i) the locations of the projector and detector, (ii) the known directions of projection for each portion of the projected pattern, and (iii) measured directions from which the reflected radiation was received;

the improvement comprising:

(e) a projector for projecting from a first predetermined location over a predetermined angular range onto the selected surface of the object a single selected pattern of electromagnetic radiation comprising an array of spatially arranged pattern elements of at least two mutually distinguishable types, where each pattern element comprises at least a first and a second discrete physical characteristic, each discrete physical characteristic being associated with a discrete type of information, said pattern being selected so that any portion of the pattern of at least some preselected minimum size is distinguishable from any other portion of the pattern; and (f) a discriminator for comparing the data generated by the converter with data representing the projected pattern, so as to match identifiable portions of the image with the corresponding portions of the projected pattern, thereby to associate identifiable portions of the image and the measured radiation associated therewith with the spatial coordinates of the locations on the surface of the scanned object on which identifiable portions of the projected pattern fell.

71. Apparatus for measuring a selected surface of an object at a distance, comprising:

(a) a projector for projecting from a first predetermined location over a predetermined angular range onto the selected surface of the object a single pattern of electromagnetic radiation comprising an array of spatially arranged pattern elements of at least two mutually distinguishable types, where each pattern element comprises at least a first and a second discrete physical characteristic, each discrete physical characteristic being associated with a discrete type of information, said pattern being selected so that any portion of the pattern of at least some preselected minimum size is distinguishable from any other portion of the pattern;

(b) a detector for receiving at a second predetermined location differing from the first predetermined location electromagnetic radiation reflected from the selected surface of the object and measuring (i) the directional distribution of the electromagnetic radiation over a scan of the object and (ii) a preselected received parameter of the reflected radiation whose variable value over the scan is measured, said preselected received parameter being selected for discriminating between and identifying pattern elements and their types within reflection data derived from electromagnetic radiation originating from the projected pattern and reflected from the selected surface of the object;

(c) a converter for converting the received electromagnetic radiation into data representing an image of the reflection of at least a portion of the projected pattern reflected from the selected surface of the object;

(d) a discriminator for comparing the data generated by the converter with data representing the projected pattern, so as to match identifiable portions of the image with the corresponding portions of the projected pattern; and (e) a coordinate calculator for calculating the spatial coordinates of the locations on the surface of the object on which each identifiable portion of the projected pattern fell, from data representing (i) the locations of the projector and detector, (ii) the known directions of projection for each portion of the projected pattern matched in the discriminator, and (iii) measured directions pursuant to those received by the detector, from which each corresponding portion of the image was received.

72. In a method for unambiguously identifying the location of a point within the view of a two- or three-dimensional measurement sensor with a single projected pattern of electromagnetic radiation comprising the steps of:

(a) projecting a binary pattern of radiation having unique codes over any span of N segments out of a total of as many as $2^N$ segments onto a surface to be measured, so that said segments form uniquely identifiable local patterns;

(b) recording reflected radiation with a detector and generating a recorded signal;

(c) analyzing the recorded signal and providing a digital representation thereof; and (d) identifying the location of the point in the pattern by comparing the digital representation with a known reference pattern digital representation;

the improvement comprising:

selecting each segment to have a selected one of two mutually distinguishable spatial structures.

73. The improvement as defined in claim 72, wherein each segment comprises a mark and a contiguous space, each segment is of a width selected to be substantially uniform as projected, and wherein the ratio of the width of the mark to the space is selected for each segment to be one of two mutually distinguishable values.

74. The improvement as defined in claim 72, wherein each segment comprises a mark and a contiguous space, each segment is of a width selected to be substantially uniform as the pattern falls upon the object, and wherein the ratio of the width of the mark to the space is selected for each segment to be one of two mutually distinguishable values.

75. The improvement as defined in claim 72, wherein each segment comprises a mark and a contiguous space, each segment as projected is of a width selected according to a predetermined scheme, and wherein the ratio of the width of the mark to the space is selected for each segment to be one of two mutually distinguishable values.

76. The improvement as defined in claim 72, wherein each discrete spatial structure comprises a binary subpattern comprised of a contiguous sequence of one preselected binary value followed by a second contiguous spatial sequence of the other binary value.

77. The improvement as defined in claim 76, wherein the binary subpatterns are 100 and 110.

78. The improvement as defined in claim 76, wherein the binary subpatterns are 1000 and 1110.

79. In or for use in an apparatus for measuring a surface portion of an object at a distance, means for imposing on projected electromagnetic radiation a single spatially varied pattern comprising an array of spatially arranged and bounded pattern elements of at least two mutually distinguishable types, where each pattern element comprises at least a first and a second discrete physical characteristic, each discrete physical characteristic being associated with a discrete type of information; said pattern being selected so that any portion of the pattern of at least some preselected minimum size is distinguishable from any other portion of the pattern.

80. Means as defined in claim 79, wherein each pattern element is comprised of a plurality of parallel bands, each band having a selected one of at least two mutually distinguishable intensities.

81. Means as defined in claim 79, wherein each pattern element is comprised of a plurality of parallel bands, each band having a selected one of at least two mutually distinguishable wavelengths.

82. Means as defined in claim 79, wherein each pattern element is comprised of a plurality of parallel bands, each band having a selected one of at least two mutually distinguishable polarizations.

83. Means as defined in claim 79, wherein each pattern element is comprised of a plurality of parallel bands alternating between high and low intensity, the bands each having a selected one of at least two mutually distinguishable widths.

84. Means as defined in claim 83 wherein the pattern elements are arranged in a sequence that can be represented by a binary number comprising 1's and 0's, where each 0 represents a narrow high-intensity band followed by a wide low-intensity band, and each 1 represents a wide high-intensity band followed by a narrow low-intensity band, and where any sequence of 1's and 0's greater in length than a predetermined sequence is unique.

85. Means as defined in claim 83, embodied in a mask.

86. Means as defined in claim 79, wherein the pattern is comprised of a plurality of parallel bands of alternating high and low intensity and a selected one of at least two mutually distinguishable widths, so arranged that when read from one end of the pattern, the pattern comprises pattern elements each comprising a high intensity band and a following low intensity band; the first discrete characteristic of a pattern element being the rising edge of the high intensity band, providing the start of the pattern element; and the second discrete physical characteristic being the width of the high intensity band relative to the width of the low intensity band, providing identification of the type of the pattern element.

87. Means as defined in claim 79, comprising a liquid crystal pattern.

88. In or for use in an apparatus for measuring a surface portion of an object at a distance, means for imposing on projected electromagnetic radiation a single spatially varied pattern comprising an array of spatially arranged pattern elements of at least two mutually distinguishable types, where each pattern element comprises at least two contrasting pattern element segments, each of at least two selected ones of said segments representing information of a discrete type; said pattern being selected so that any portion of the pattern of at least some preselected minimum size is distinguishable from any other portion of the pattern.

89. Means as defined in claim 88, wherein the pattern is comprised of a plurality of pattern element segments of alternating high and low intensity and a selected one of at least two mutually distinguishable widths, so arranged that when read from one end of the pattern, the pattern comprises pattern elements of substantially uniform width, each pattern element comprising a high intensity pattern element segment and a following low intensity pattern element segment; the high intensity pattern element segment providing information identifying the start of the pattern element; and the width of the high intensity pattern element segments relative to the width of the low intensity pattern element segments providing information identifying the type of the pattern element.

90. In a method of measuring a selected surface of an object at a distance that comprises the steps of projecting a pattern on the object, detecting and observing the reflection of that pattern, and correlating distance data for the selected surface of the object determined by triangulation with data representing elements of the reflected pattern or an identifiable portion thereof, and wherein some of the pattern data may be missing or contaminated;

an improved method of pattern element recovery comprising:

computing from apparently reliable observed reflection data the pattern trend of an identifiable portion of the reflected pattern;

estimating the expected value of a selected parameter within the observed data associated with the next adjacent observed portion of the pattern outside the reliable data;

testing the observed value of said parameter for the next adjacent observed portion of the pattern so as to assess the degree of correspondence between the observed and estimated expected values for such parameter at such next adjacent observed portion of the pattern; and accepting, rejecting, or relocating the position of the next adjacent observed portion of the pattern in dependence upon the degree of correspondence, and, where such next adjacent portion of the observed pattern is to be relocated, relocating data associated with said next adjacent portion to a position further away from the apparently reliable observed reflection data and inserting a parameter value for data located between the reliable data and the relocated data;

so as to provide data representing an apparent continuity of the reflected pattern in correspondence with the transmitted pattern, as embodied in the reflected pattern data.

91. In or in combination with apparatus for measuring a selected surface of an object at a distance that includes a projector for projecting a pattern on the object, a receiver for detecting and observing the reflection of that pattern, a correlator for correlating distance data for the selected surface of the object determined by triangulation with data representing elements of the reflected pattern or an identifiable portion thereof, and wherein some of the pattern data may be missing or contaminated;

pattern element recovery apparatus comprising:

means for computing from apparently reliable observed reflection data the pattern trend of an identifiable portion of the reflected pattern;

means for estimating the expected value of a selected parameter within the observed data associated with the next adjacent observed portion of the pattern outside the reliable data;

means for testing the observed value of said parameter for the next adjacent observed portion of the pattern so as to assess the degree of correspondence between the observed and estimated expected values for such parameter at such next adjacent observed portion of the pattern; and means for accepting, rejecting, or relocating the position of the next adjacent observed portion of the pattern in dependence upon the degree of correspondence, and, where such next adjacent portion of the observed pattern is to be relocated, relocating data associated with said next adjacent portion to a position further away from the apparently reliable observed reflection data and inserting a parameter value for data located between the reliable data and the relocated data;

so as to provide data representing an apparent continuity of the reflected pattern in correspondence with the transmitted pattern, as embodied in the reflected pattern data.

92. In a method of measuring a selected surface of an object at a distance that comprises the steps of projecting a pattern on the object, such pattern being comprised of pattern elements of substantially uniform width but having variable-width bright marks of at least two mutually distinguishable mark widths, and detecting the reflection of that pattern to generate observed reflection data representative of an observed sequence of pattern elements corresponding to a valid sequence of transmitted pattern elements within the pattern, so as to correlate distance data for the selected surface of the object determined by triangulation with received pattern element data; and wherein some of the observed reflection data may be missing or contaminated;

a method of pattern element recovery for validating a sequence of pattern elements represented by corrected reflection data comprising:

computing from reflection data accepted as reliable data the trend of the reflected pattern in the reflection data;

estimating the expected sequence number in the sequence of pattern elements for the next observed data outside the reliable data for that pattern element apparently next in sequence in said trend so as to assess the degree of correspondence between the observed and estimated sequence numbers; and accepting, rejecting, or offsetting the data associated with the pattern element apparently next in sequence in the trend in dependence upon the degree of correspondence, and, where such observed pattern element position is to be offset, relocating such pattern element to a position further away from the sequence of positions in the established pattern trend, and inserting data corresponding to a contrived pattern element between the established trend and the offset pattern elements;

so as to provide data representing an apparent continuity of the reflected pattern data in correspondence with the transmitted pattern.

93. In or in combination with apparatus for measuring a selected surface of an object at a distance that includes a projector for projecting a pattern on the object, such pattern being comprised of pattern elements of substantially uniform width but having variable-width bright marks of at least two mutually distinguishable mark widths, a receiver for detecting the reflection of that pattern to generate observed reflection data representative of an observed sequence of pattern elements corresponding to a valid sequence of transmitted pattern elements within the pattern, a correlator for correlating distance data for the selected surface of the object determined by triangulation with the observed sequence of pattern elements; and wherein some of the expected observed reflection data may be missing or contaminated;

pattern element recovery apparatus for validating a sequence of pattern elements represented by corrected reflection data comprising:

means for computing from reflection data accepted as reliable data the trend of the reflected pattern in the reflection data;

means for estimating the expected sequence number in the sequence of pattern elements for the next observed data outside the reliable data for that pattern element apparently next in sequence in said trend so as to assess the degree of correspondence between the observed and estimated sequence numbers; and means for accepting, rejecting, or offsetting the data associated with the pattern element apparently next in sequence in the trend in dependence upon the degree of correspondence, and, where such observed pattern element position is to be offset, relocating such pattern element to a position further away from the sequence of positions in the established pattern trend, and inserting data corresponding to a contrived pattern element between the established trend and the offset pattern elements;

so as to provide data representing an apparent continuity of the reflected pattern data in correspondence with the transmitted pattern.

94. In or in combination use with apparatus for measuring a selected surface of an object at a distance that comprises means for projecting a pattern of electromagnetic radiation on the object, means for detecting and observing the reflection of that pattern, means for correlating distance data for the selected surface of the object with spatial coordinates on that surface determined by triangulation with data representing elements of the reflected pattern or an identifiable portion thereof, and wherein some of the pattern data may be missing or contaminated;

pattern element recovery apparatus comprising:

means for computing from apparently reliable observed reflection data the pattern trend of an identifiable portion of the reflected pattern;

means for estimating the expected value of a selected parameter within the observed data associated with the next adjacent observed portion of the pattern outside the reliable data;

means for testing the observed value of said parameter for the next adjacent observed portion of the pattern so as to assess the degree of correspondence between the observed and estimated expected values for such parameter at such next adjacent observed portion of the pattern; and means for accepting, rejecting, or relocating the position of the next adjacent observed portion of the pattern in dependence upon the degree of correspondence, and, where such next adjacent portion of the observed pattern is to be relocated, relocating data associated with said next adjacent portion to a position further away from the apparently reliable observed reflection data and inserting a parameter value for data located between the reliable data and the relocated data;

so as to provide a data signal representing an apparent continuity of the reflected pattern in correspondence with the transmitted pattern, as embodied in the reflected pattern data.

95. In or in combination with apparatus for measuring a selected surface of an object at a distance that comprises means for projecting a pattern of electromagnetic radiation on the object, such pattern being comprised of pattern elements of substantially uniform width but having variable-width bright marks of at least two mutually distinguishable mark widths, means for detecting the reflection of that pattern to generate observed reflection data representative of an observed sequence of pattern elements corresponding to a valid sequence of transmitted pattern elements within the pattern, and means for correlating distance data for the selected surface of the object with spatial coordinates on that surface determined by triangulation and wherein some of the expected observed reflection data may be missing or contaminated;

pattern element recovery apparatus for validating a sequence of pattern elements represented by corrected reflection data comprising:

means for computing from reflection data accepted as reliable data the trend of the reflected pattern in the reflection data;

means for estimating the expected sequence number in the sequence of pattern elements for the next observed data outside the reliable data for that pattern element apparently next in sequence in said trend so as to assess the degree of correspondence between the observed and estimated sequence numbers; and means for accepting, rejecting, or offsetting the data associated with the pattern element apparently next in sequence in the trend in dependence upon the degree of correspondence, and, where such observed pattern element position is to be offset, relocating such pattern element to a position further away from the sequence of positions in the established pattern trend, and inserting data corresponding to a contrived pattern element between the established trend and the offset pattern elements;

so as to provide a data signal representing an apparent continuity of the reflected pattern data in correspondence with the transmitted pattern.

* * * * *

UNITED STATES PATENT AND TRADEMARK OFFICE
CERTIFICATE OF CORRECTION

PATENT NO. : 5,615,003
DATED : March 25, 1997
INVENTOR(S) : Alexander Thomas Hermary, et al It is certified that error appears in the above-indentified patent and that said Letters Patent is hereby corrected as shown below:

Column 7, line 41, replace "an" with --a--.

Column 7, line 44, after "is" insert --a--.

Column 7, line 49, after "is" insert --a--.

Column 15, line 29, replace "of" (first occurrence) with --or--.

Column 17, line 49, replace "Limited." with --Limited,--.

Column 20, line 34, replace "remained" with --remaining--.

Column 28, line 43, Claim 27, replace "22" with --23--.

Column 40, line 7, Claim 94, delete "use".

Signed and Sealed this

Fourteenth Day of October, 1997

BRUCE LEHMAN

*Attest:*

*Attesting Officer*   *Commissioner of Patents and Trademarks*